United States Patent
Horikoshi et al.

(10) Patent No.: US 6,281,994 B1
(45) Date of Patent: Aug. 28, 2001

(54) METHOD AND APPARATUS FOR THREE-DIMENSIONAL HOLOGRAPHIC DISPLAY SUITABLE FOR VIDEO IMAGE DISPLAY

(75) Inventors: Tsutomu Horikoshi; Haruhiko Kojima, both of Yokohama; Noboru Sonehara, Zushi; Masahiro Sasaura, Hitachinaka; Tadayuki Imai, Mito; Shogo Yagi, Mito; Akiyuki Tate, Mito; Kazuhito Higuchi; Takaaki Akimoto, both of Yokohama, all of (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 09/469,850

(22) Filed: Dec. 21, 1999

(30) Foreign Application Priority Data

Dec. 22, 1998 (JP) ................................. P10-363698
Jan. 21, 1999 (JP) ................................. P11-012567
Mar. 10, 1999 (JP) ................................. P11-062957
Jul. 26, 1999 (JP) ................................. P11-210970

(51) Int. Cl.$^7$ .................................................. G03H 1/22
(52) U.S. Cl. ................................... 359/32; 359/4; 359/7; 359/12; 359/35; 359/22
(58) Field of Search .............................. 359/4, 7, 12, 22, 359/32, 35

(56) References Cited

U.S. PATENT DOCUMENTS 4,512,624 * 4/1985 Nicholson ............................... 359/12
6,002,499 * 12/1999 Corboline et al. ....................... 359/2

OTHER PUBLICATIONS

"Three–dimensional Holographic Display Using a Photorefractive Crystal", Heid, et al.; *Sixth International Symposium on Display Holography*, Feb. 1998, The International Society for Optical Engineering (SPIE).

"Hologram Bandwidth Reduction by Space–Time Multiplexing", Hildebrand, *Journal of the Optical Society of America*, vol. 60, No. 2, Feb. 1970.

"Depth–resolved Holographic Imaging Through Scattering Media by Photorefraction", Hyde, et al., *1995 Optical Society of America*, Jun. 1, 1995, vol. 20, No. 11.

* cited by examiner

Primary Examiner—Darren Schuberg
(74) Attorney, Agent, or Firm—Kilpatrick Stockton LLP

(57) ABSTRACT

A method and an apparatus for three-dimensional holographic display suitable for moving object display are disclosed. At least one hologram of a display target object is displayed on a display device, and a non-scattered light is irradiated onto the display device to produce a scattered light. Then the scattered light from the display device as an object light of the display target object and the non-scattered light as a reference light are irradiated simultaneously at different incident angles onto a photorefractive medium having a photorefractive effect, and interference fringes generated by the object light and the reference light are recorded in the photorefractive medium. Then, the three-dimensional image is displayed by irradiating only the non-scattered light onto the photorefractive medium so as to reproduce a holographic image corresponding to the interference fringes recorded in the photorefractive medium.

40 Claims, 26 Drawing Sheets

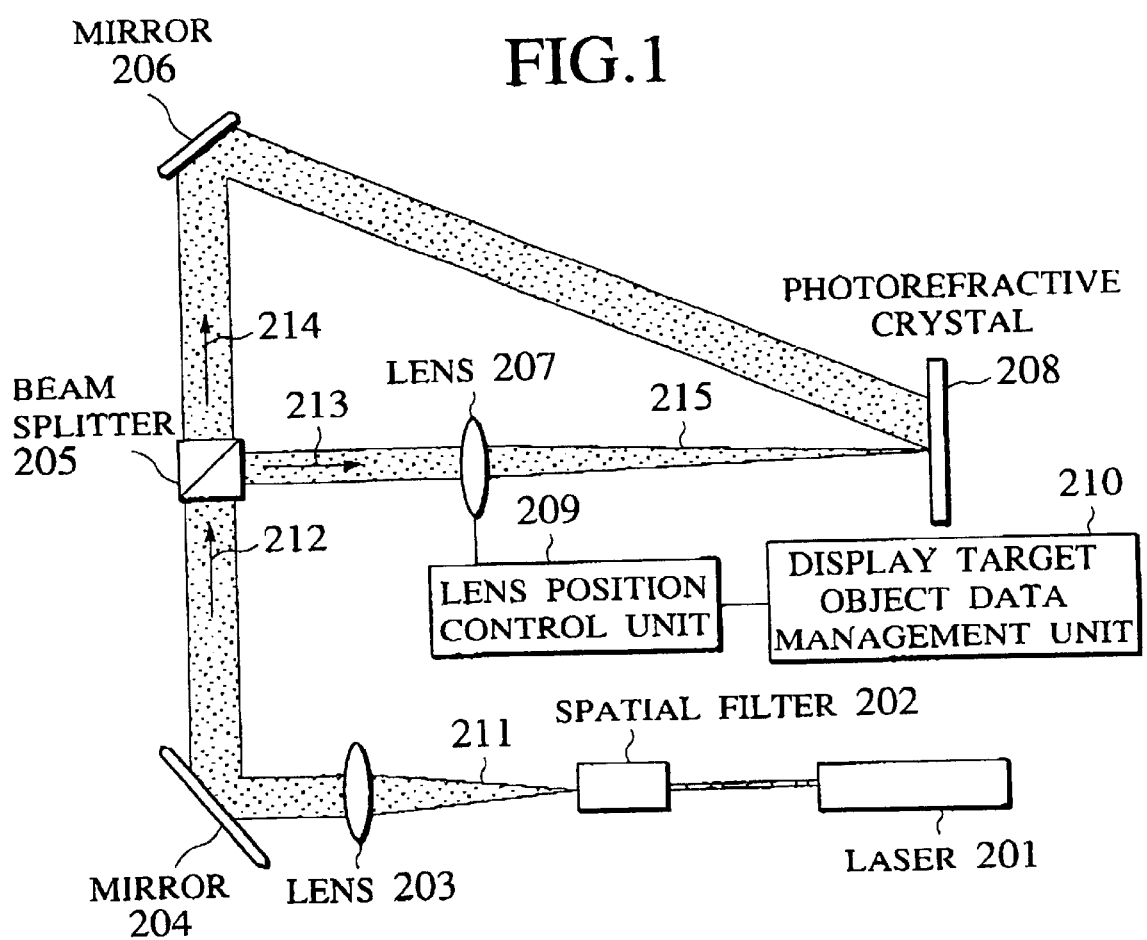

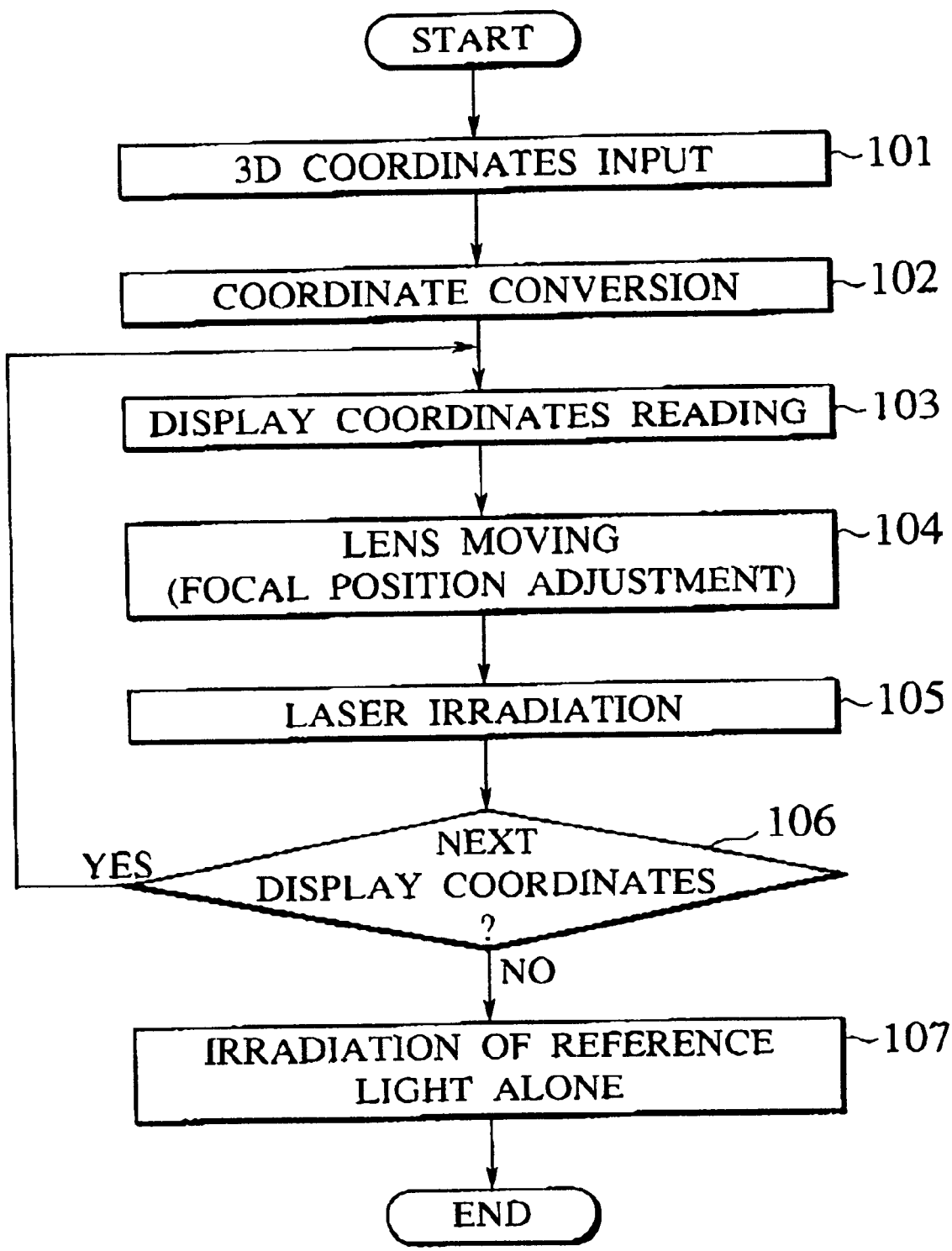

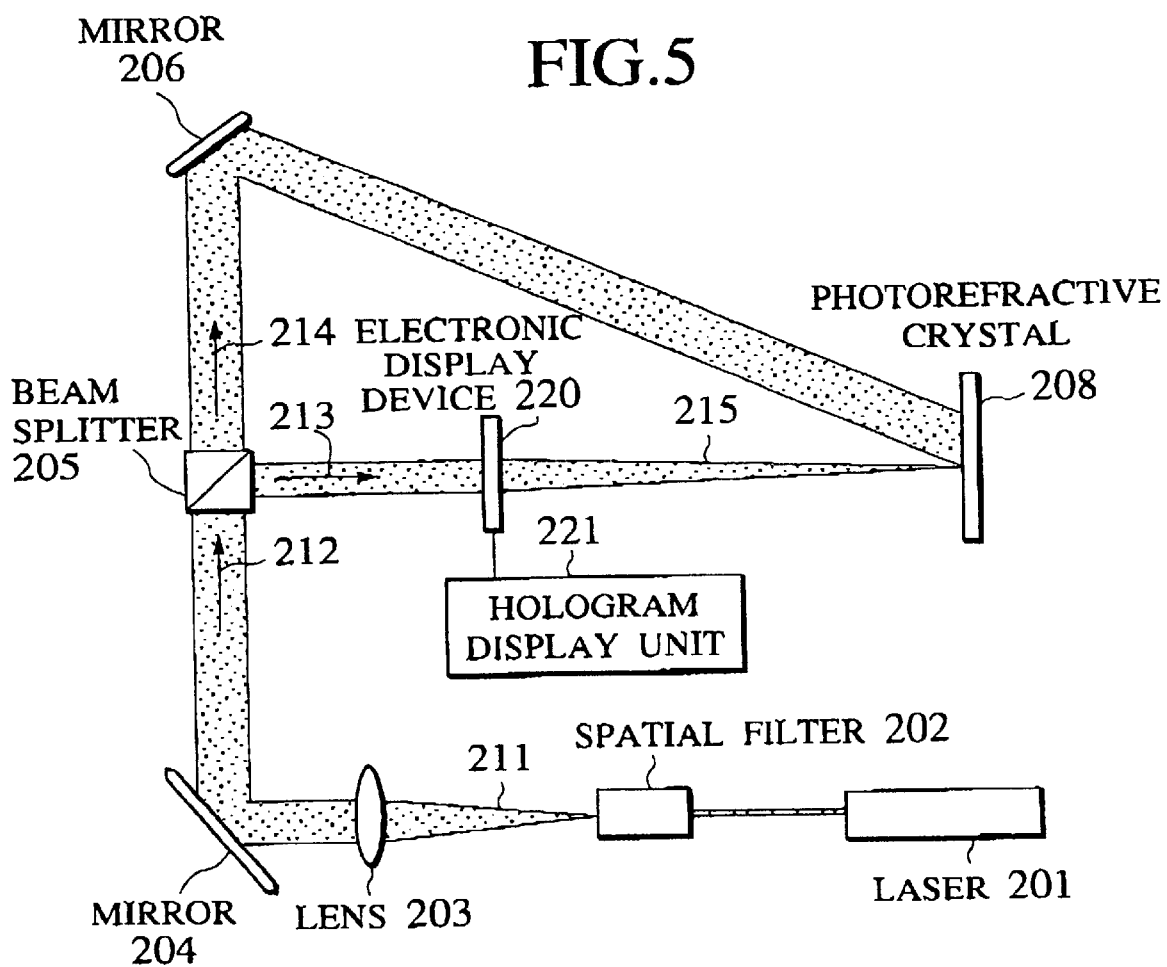

3D IMAGE TO BE DISPLAYED

EYE (OBSERVER)

METHOD AND APPARATUS FOR THREE-DIMENSIONAL HOLOGRAPHIC DISPLAY SUITABLE FOR VIDEO IMAGE DISPLAY

BACKGROUND OF THE INVENTION

1. Field of the Invention

The present invention relates to a method and an apparatus for three-dimensional holographic display suitable for video image display, using optical interference fringes recorded inside a photorefractive crystal which can display three-dimensional video images by irradiating a reference light thereon.

2. Description of the Background Art

The known methods for three-dimensional display of an object include a method based on stereography and a method based on holography. The former method based on stereography is a method in which images to be observed by left and right eyes are separately projected onto eyes, and only an observer can see a display target object three-dimensionally. The latter method based on holography is a method that faithfully reproduces wavefronts of lights reflected from an object.

The major factors that enable a human being to sense an object three-dimensionally include a binocular parallax and a focus adjustment. The method based on stereography is a method that reproduces only the binocular parallax, where the focus of the eyes is always set on a screen on which images are projected, so that there has been a problem that the eyestrain is inevitably caused by an observation over an extended period of time because the focal position is fixed despite of the object projection effect due to the binocular parallax.

On the other hand, the method based on holography is the most ideal method for three-dimensional display, in which both the binocular parallax and the focus adjustment can be realized exactly as in the real observation by the eyes. However, in order to record holograms, it is necessary to reproduce the light diffraction phenomenon, so that there is a need to record as many as several thousands of interference fringes per millimeter and reproduce a display from them. For this reason, the presently available holograms are all three-dimensional display of still pictures.

As a method for displaying moving objects by holography, there has been a proposition of a method using a liquid crystal panel, but the resolution (spatial frequency, pixel pitch) that can be displayed by the liquid crystal panel is insufficient for the holographic display. Namely, because of the low resolution (wide pixel pitch) and the limitation of the gray scale values that can be displayed, this method is still insufficient to display complicated fringes such as those of the actual holograms.

For this reason, in the holographic display using such electronic devices, it is only possible to display a few, small objects (point light sources). Moreover, because of the coarse resolution, there has been a problem that a separation of a light that is transmitted directly through the liquid crystal panel and the diffracted light is difficult, and the observation field is narrow.

SUMMARY OF THE INVENTION

It is therefore an object of the present invention to provide a method and an apparatus for three-dimensional holographic display capable of recording three-dimensional images efficiently into a photorefractive crystal that is to be used as a screen for projecting images.

It is another object of the present invention to provide a method and an apparatus for three-dimensional holographic display capable of reproducing a three-dimensional image in a wide view field by using an electronic device having a limited resolution.

It is another object of the present invention to provide a method and an apparatus for three-dimensional holographic display capable of displaying three-dimensional video images with less flickering, and displaying a plurality of frames of three-dimensional still images by switching frames at high speed.

It is another object of the present invention to provide a method and an apparatus for three-dimensional holographic display capable of displaying a three-dimensional image in a wide view field by using a compact configuration.

It is another object of the present invention to provide a method and an apparatus for three-dimensional holographic display using a spatial light modulator as an object light source for the hologram, capable of realizing finer three-dimensional image display.

It is another object of the present invention to provide a method and an apparatus for three-dimensional holographic display using a spatial light modulator as an object light source for the hologram, capable of improving the quality of the three-dimensional image display.

It is another object of the present invention to provide a method and an apparatus for three-dimensional holographic display using a spatial light modulator as an object light source for the hologram, capable of enlarging the spatial view field.

According to one aspect of the present invention there is provided a method of holographic display of a three-dimensional image, comprising the steps of: displaying at least one hologram of a display target object on a display device, and irradiating a non-scattered light onto the display device to produce a scattered light; irradiating the scattered light from the display device as an object light of the display target object and the non-scattered light as a reference light simultaneously at different incident angles onto a photorefractive medium having a photorefractive effect, and recording interference fringes generated by the object light and the reference light in the photorefractive medium; and displaying the three-dimensional image by irradiating only the non-scattered light onto the photorefractive medium so as to reproduce a holographic image corresponding to the interference fringes recorded in the photorefractive medium.

According to another aspect of the present invention there is provided a three-dimensional holographic display apparatus, comprising: a display device for displaying at least one hologram of a display target object; a photorefractive medium having a photorefractive effect for recording interference fringes generated by an object light and a reference light irradiated thereon; and an optical system for irradiating a non-scattered light onto the display device to produce a scattered light and then irradiating the scattered light from the display device as the object light of the display target object and the non-scattered light as the reference light simultaneously at different incident angles onto the photorefractive medium at a time of recording the interference fringes in the photorefractive medium, and irradiating only the non-scattered light onto the photorefractive medium at a time of reproducing a holographic image corresponding to the interference fringes recorded in the photorefractive medium as a three-dimensional image.

According to another aspect of the present invention there is provided a method of holographic recording of a three-dimensional image, comprising the steps of: irradiating first and second lights simultaneously at different incident angles onto a photorefractive medium having a photorefractive effect, the first light being irradiated directly onto the photorefractive medium and the second light being irradiated onto the photorefractive medium through a lens with an adjustable lens position which is adjusted such that a focal point position of the lens coincides with a point on a surface of the three-dimensional image to be displayed; recording interference fringes generated by the first light and the second light in the photorefractive medium; and repeating the irradiating step and the recording step while sequentially adjusting the adjustable lens position of the lens so as to set the focal point position of the lens on different points on the surface of the three-dimensional image to be displayed.

According to another aspect of the present invention there is provided a method of holographic recording of a three-dimensional image, comprising the steps of: displaying interference fringes on an electronic display device, the interference fringes being calculated for a case of irradiating first and second lights simultaneously at different incident angles onto a photorefractive medium having a photorefractive effect, the first light being irradiated directly onto the photorefractive medium and the second light being irradiated onto the photorefractive medium through a lens with an adjustable lens position which is adjusted such that a focal point position of the lens coincides with a point on a surface of the three-dimensional image to be displayed; recording interference fringes displayed on the electronic display device in the photorefractive medium; and repeating the displaying step and the recording step while sequentially adjusting the adjustable lens position of the lens used so as to set the focal point position of the lens on different points on the surface of the three-dimensional image to be displayed in calculating the interference fringes to be displayed on the electronic display device.

According to another aspect of the present invention there is provided a three-dimensional holographic recording apparatus, comprising: a photorefractive medium having a photorefractive effect for recording interference fringes generated by an object light and a reference light irradiated thereon; an optical system for irradiating first and second lights simultaneously at different incident angles as the object light and the reference light onto the photorefractive medium, the first light being irradiated directly onto the photorefractive medium and the second light being irradiated onto the photorefractive medium through a lens with an adjustable lens position which is adjusted such that a focal point position of the lens coincides with a point on a surface of a three-dimensional image to be displayed, such that interference fringes generated by the first light and the second light are recorded in the photorefractive medium; and a lens position controller for sequentially adjusting the adjustable lens position of the lens so as to set the focal point position of the lens on different points on the surface of the three-dimensional image to be displayed, while the optical system repeats irradiation of the first and second lights and recording of the interference fringes.

According to another aspect of the present invention there is provided a three-dimensional holographic recording apparatus, comprising: a photorefractive medium having a photorefractive effect for recording interference fringes generated by an object light and a reference light irradiated thereon; an electronic display device for displaying interference fringes calculated for a case of irradiating first and second lights simultaneously at different incident angles onto the photorefractive medium, the first light being irradiated directly onto the photorefractive medium and the second light being irradiated onto the photorefractive medium through a lens with an adjustable lens position which is adjusted such that a focal point position of the lens coincides with a point on a surface of a three-dimensional image to be displayed, such that the interference fringes displayed on the electronic display device are recorded in the photorefractive medium; and a display device controller for controlling the electronic display device to repeat display of the interference fringes while sequentially adjusting the adjustable lens position of the lens so as to set the focal point position of the lens on different points on the surface of the three-dimensional image to be displayed in calculating the interference fringes to be displayed on the electronic display device.

Other features and advantages of the present invention will become apparent from the following description taken in conjunction with the accompanying drawings.

BRIEF DESCRIPTION OF THE DRAWINGS

FIG. 1 is a block diagram showing a first exemplary schematic configuration of a three-dimensional image recording device according to the first embodiment of the present invention.

FIG. 2 is a flow chart for a processing procedure of the three-dimensional image recording device of FIG. 1.

FIG. 5 is a block diagram showing a second exemplary schematic configuration of a three-dimensional image recording device according to the first embodiment of the present invention.

DETAILED DESCRIPTION OF THE PREFERRED EMBODIMENTS

Referring now to FIG. 1 to FIG. 7, the first embodiment of a method and an apparatus for three-dimensional holographic display according to the present invention will be described in detail.

First, the principle of the holographic display using a photorefractive crystal according to the first embodiment will be described.

A photorefractive crystal has a property that a refractive index of the crystal changes according to an intensity of light irradiated thereon. Using this property, the photorefractive crystal has been mainly utilized as a holographic recording element.

By utilizing this photorefractive crystal as a screen on which images are to be projected, it is possible to display three-dimensional images. Namely, a lens position is sequentially controlled such that a point on a surface (contour, boundary surface, etc.) of a three-dimensional image to be displayed coincides with a focal position of a lens, and an entire display target region of the three-dimensional image to be displayed is scanned.

The lights converged onto a surface (contour, boundary surface, etc.) of the three-dimensional image through the lens are then irradiated onto the photorefractive crystal as wavefronts of lights in the case where a point light source is located at the focal position of the lens. At the same time, a reference light is irradiated onto the photorefractive crystal at a different incident angle such that interference fringes of the lens transmitted lights and the reference light are generated inside the photorefractive crystal, and these fringes are recorded inside the photorefractive crystal.

After the scanning of the surface of the three-dimensional image to be displayed is completed, when the reference light alone is irradiated onto the photorefractive crystal, the interference fringes recorded in the photorefractive crystal function as a diffraction grating such that wavefronts of lights from the individual focal positions are reproduced.

Figure 7:
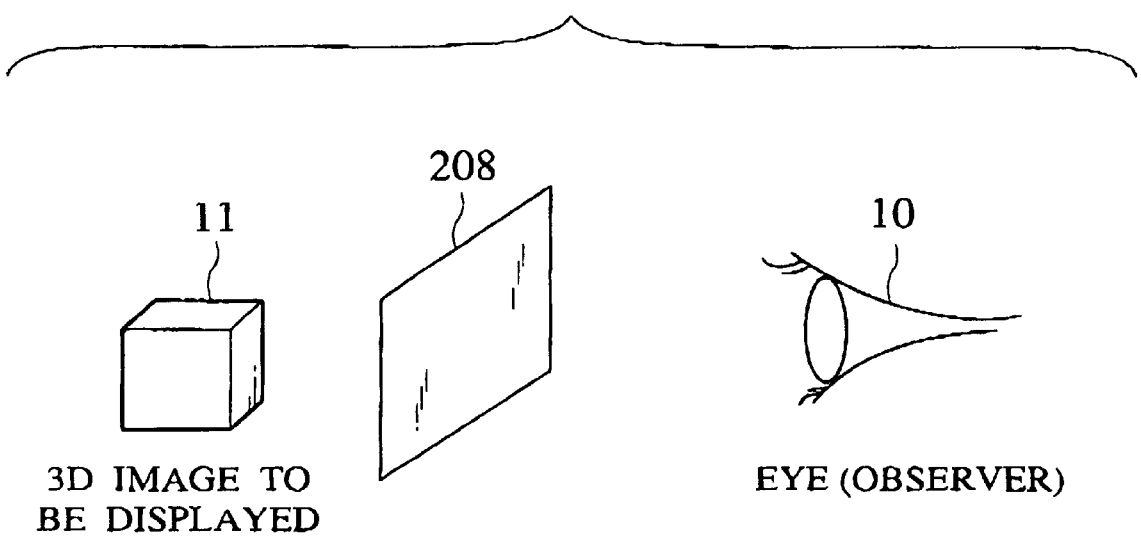
FIG. 7 is a schematic diagram for explaining an operational principle of a three-dimensional holographic display according to the first embodiment of the present invention.

In other words, the focal positions of the lens function as virtual point light sources of the three-dimensional image to be displayed. Consequently, as shown in FIG. 7, an observer 10 who looked into the photorefractive crystal 208 will observe the diffracted lights. In this case, the observer 10 senses as if the lights are propagating straight so that the lights are sensed as coming from the surface of the three-dimensional image 11 to be displayed, and thereby the three-dimensional image 11 to be displayed will be recognized as a three-dimensional object.

Now, the first specific example of a three-dimensional holographic display according to the first embodiment will be described.

FIG. 1 shows a first exemplary schematic configuration of a three-dimensional image recording device according to the first embodiment.

This three-dimensional image recording device uses a laser beam as a light to be used for recording. The laser beam irradiated from a laser 201 is converted into spherical wave 211 by a spatial filter 202.

This spherical wave 211 is then converted into a plane wave 212 by a lens 203, and this plane wave 212 is reflected by a mirror 204 and then split into two plane waves 213 and 214 by a beam splitter 205.

One plane wave 213 that is split by the beam splitter 205 is converted into a spherical wave 215 again by a lens 207, and a wavefront of this spherical wave 215 is irradiated onto the photorefractive crystal 208.

The other plane wave 214 that is split by the beam splitter 205 is reflected by a mirror 206, and irradiated onto the photorefractive crystal 208 as the reference light.

FIG. 2 shows a processing procedure of the three-dimensional image recording device of FIG. 1, which proceeds as follows.

First, vertex data of the display target three-dimensional object are entered into a display target object data management unit 210 from an input unit (not shown) (step 101). These vertex data can be obtained from a model generated by the computer graphics by modeling a three-dimensional shape in a computer, decomposing a surface of the display target three-dimensional object into fine meshes, and obtaining vertex data of individual meshes as these vertex data. Alternatively, the surface coordinate data of the display target three-dimensional object that are actually measured by a three-dimensional measurement device may be used as these vertex data.

Next, at the display target object data management unit 210, in order to display the three-dimensional image of the display target three-dimensional object within a prescribed space, the vertex coordinates of the display target three-dimensional object are converted into the display target space coordinate system (step 102). For example, a partial space that entirely contains the display target three-dimensional object is set up in the world coordinate system of the original data, and the local coordinate system of the partial space is taken to be the display target space coordinate system.

Next, data of the three-dimensional image to be displayed (display vertex coordinates) are sequentially read out (step 103).

Next, a lens position control unit 209 moves a lens position of the lens 207 such that the surface position of the three-dimensional image coincides with the focal position of the lens 207, according to (x, y, z) coordinate values of the vertex coordinates sequentially read out at the step 103 (step 104).

Then, the laser beam is irradiated (step 105). Here, the plane wave 213 is transmitted through the lens 207 after moving, and the transmitted light is irradiated onto the photorefractive crystal 208, while at the same time the reference light (plane wave 214) is also irradiated onto the photorefractive crystal 208.

As a result, the interference is caused by the transmitted light and the reference light, and the interference fringes are generated in the photorefractive crystal 208. The photorefractive crystal 208 changes its refractive indices according to these interference fringes, and record them as the interference fringes.

The processing from the step 103 to the step 105 is repeated until all the data of the three-dimensional image to be displayed are processed (step 106).

In this way, the interference fringes of wavefronts generated from a plurality of point light sources will be multiply recorded in the photorefractive crystal 208.

After scanning the entire data of the three-dimensional image to be displayed, the lens transmitted light 215 is blocked such that the reference light (plane wave 214) alone is irradiated (step 107), while an observer looks into the photorefractive crystal 208. As a result, the observer can observe the three-dimensional image.

Note that, at the step 107, it is also possible to take off the photorefractive crystal 208 from the recording system and then irradiate another reference light separately at the same angle as used in the recording.

Also, the display target object data management unit 210 and the lens position control unit 209 can be provided in a form of a computer, and in such a case, the display target object data management unit 210 and the lens position control unit 209 can be realized by the execution of a lens moving program stored in a main memory of the computer. This lens moving program may also be provided in a form of a recording medium such as CD-ROM, for example.

Figure 3A:
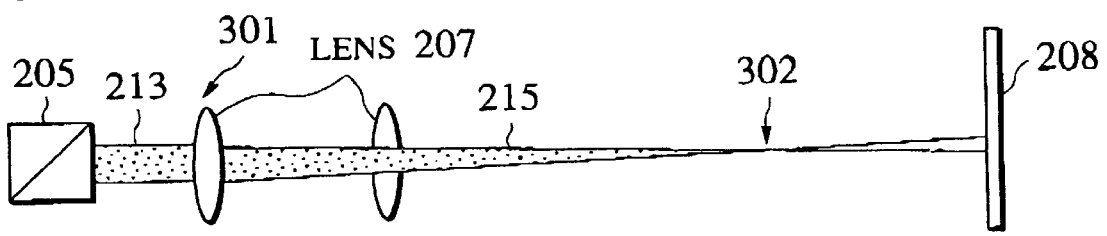
FIGS. 3A and 3B are diagrams showing two exemplary cases of a lens position control in the three-dimensional image recording device of FIG. 1.
Figure 3B:
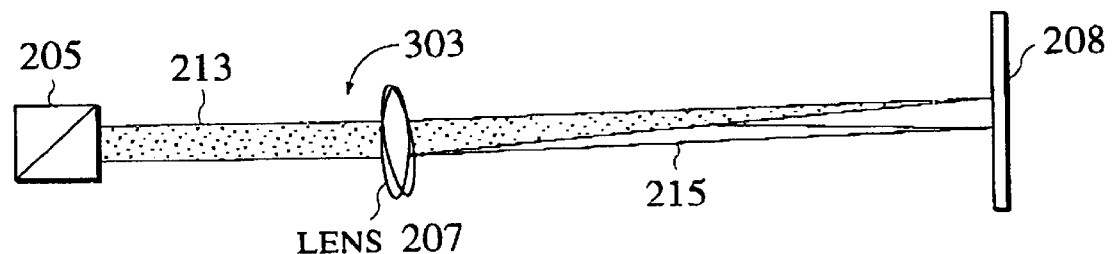

FIGS. 3A and 3B show two exemplary cases of the lens position control for the lens 207. By moving the position of the lens 207 forward or backward as shown in FIG. 3A, the focal position distance moves forward or backward so that the wavefronts of lights irradiated onto the photorefractive crystal 208 are changed. For example, when the lens 207 is located at a position 301, the interference fringe by which the lights are converged onto a position 302 at the focal point distance will be recorded in the photorefractive crystal 208. Namely, when the observer looks into the photorefractive crystal 208, the observer can observe an image as if there is a point light source at the position 302.

Also, by rotating the lens 207 as indicated by an arrow 303 as shown in FIG. 3B, it is possible to reproduce a point light source with not only a different focal point distance but also a different focal point position.

Figure 4:
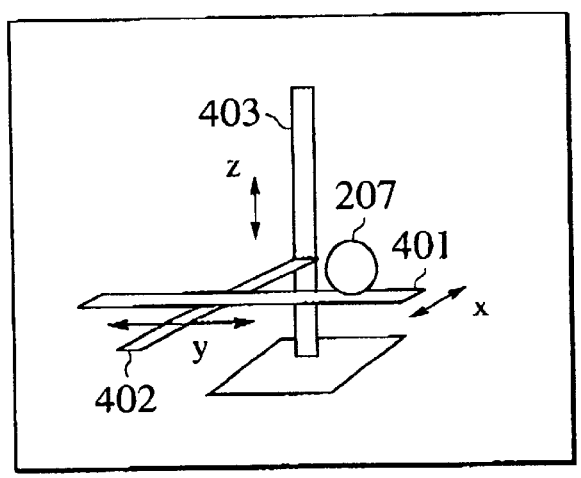
FIG. 4 is a schematic diagram showing an exemplary mechanism for moving a lens position in the three-dimensional image recording device of FIG. 1.

In addition, as shown in FIG. 4, by attaching the lens 207 to arms 401, 402, 403 which are capable of moving along (x, y, z) axes directions, it is possible to freely change the focal point distance and the position in the space.

As described, in this embodiment, the coherent light is split into two optical paths by using a device configuration of an interferometer. The split lights have their wavelengths and phases aligned so that they interfere with each other well, and therefore it is possible to record the interference fringes efficiently in this embodiment.

Also, the photorefractive crystal 208 requires a different recording time depending on the intensity of the irradiated light, but in this embodiment, the utilization efficiency of lights is increased by converging lights using the lens 207, so that the recording time can be shortened.

Now, the second specific example of a three-dimensional holographic display according to the first embodiment will be described.

FIG. 5 shows a second exemplary schematic configuration of a three-dimensional image recording device according to the first embodiment.

In the first specific example described above, the focal point distance and position are changed by moving the lens 207. Also, in the first specific example described above, the interference fringes (standing waves) generated by the interference between the transmitted light and the reference light are obtained in forms of Fresnel lens patterns (that is, concentric fringe images).

In contrast, in the second specific example shown in FIG. 5, the Fresnel lens patterns obtained by sequentially changing the focal point distance and position are generated by a hologram display unit 221 and displayed on an electronic display device 220 such as liquid crystal display device, for example. Then, these Fresnel lens patterns are irradiated onto the photorefractive crystal 208. The rest of the configuration of FIG. 5 is similar to that of FIG. 1 described above.

The interference fringes generated in the photorefractive crystal 208 are recorded in the photorefractive crystal 208, and the lights from the three-dimensional image to be displayed will be reproduced as the reference light is diffracted by the recorded interference fringes.

The electronic display device 220 such as the liquid crystal display device itself has a limitation on the resolution so that the ordinary hologram obtained by recording complicated interference fringes cannot be displayed directly. However, the photorefractive crystal 208 has a sufficient resolution for recording the hologram.

Figure 6A:
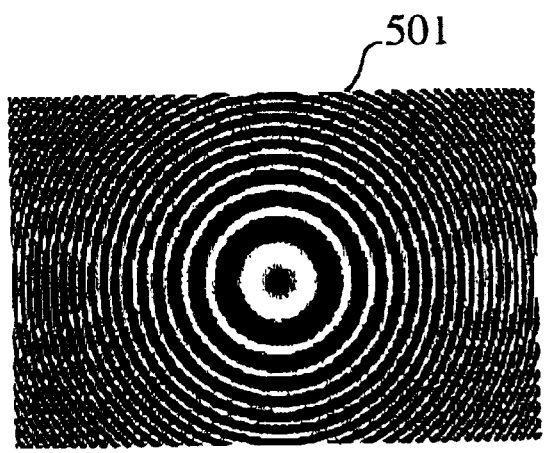
FIGS. 6A and 6B are diagrams showing two exemplary Fresnel lens patterns that can be displayed at an electronic display device in the three-dimensional image recording device of FIG. 5.
Figure 6B:
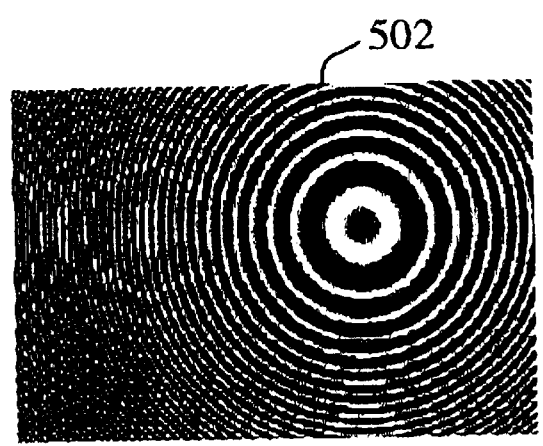

Here, the electronic display device 220 displays a wavefront pattern of a light generated by a single point light source alone in each single display, for example. In this case, it suffices to display the Fresnel lens pattern as shown in FIG. 6A or 6B, which can be reproduced even by the low resolution (spatial frequency) of the electronic display device 220. FIGS. 6A and 6B show exemplary interference fringes to be displayed by the electronic display device 220 in this second specific example. A pattern 501 shown in FIG. 6A is the Fresnel lens pattern having a focal point in a vicinity of a central axis, while a pattern 502 shown in FIG. 6B is the Fresnel lens pattern in which the focal point position is moved.

The focal point position of the Fresnel lens corresponds to a point light source, so that by sequentially displaying the Fresnel lens patterns with different point light source positions and recording them in the photorefractive crystal 208, the wavefronts of lights irradiated from the respective moved point light sources are multiply recorded in forms of interference fringes on the photorefractive crystal 208.

Instead of displaying the Fresnel lens pattern, it is also possible to calculate wavefronts from a plurality of points on a surface of the three-dimensional image to be displayed, obtain the fringe patterns generated by these wavefronts and the plane wave (reference light) 214 and display them on the electronic display device 220. Namely, assuming the a plurality of point light sources exist on a surface of the three-dimensional image, the interference fringes generated by these point light sources can be obtained by calculation, and the obtained interference fringes can be displayed on the electronic display device 220.

Figure 6C:
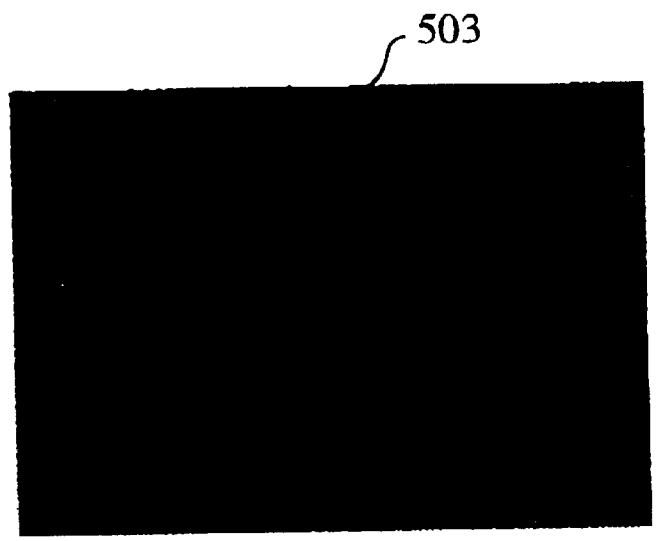
FIG. 6C is a diagram showing an exemplary interference fringe pattern that can be displayed at an electronic display device in the three-dimensional image recording device of FIG. 5.

FIG. 6C shows exemplary interference fringes 503 generated by the point light sources assuming that a plurality of point light sources exist on a surface of the three-dimensional image.

Note that, in the photorefractive crystal 208, the recorded interference fringes can be erased by irradiating a plane wave, so that it is also possible to reproduce the video images by repeating the recording and the erasing.

As described, according to the first embodiment, it becomes possible to record the interference fringes of lights efficiently into the photorefractive crystal.

Moreover, it is possible to increase the utilization efficiency of lights so that the recording time at a time of recording the interference fringes of lights into the photorefractive crystal can be shortened.

Furthermore, by using the photorefractive crystal of this embodiment, it becomes possible to display the truly three-dimensional image with vertical and horizontal parallaxes.

In addition, by rewriting the interference fringes of lights recorded in the photorefractive crystal at high speed, it becomes possible to display the video images by using the photorefractive crystal.

Referring now to FIG. 8 to FIG. 12, the second embodiment of a method and an apparatus for three-dimensional holographic display according to the present invention will be described in detail.

Figure 8:
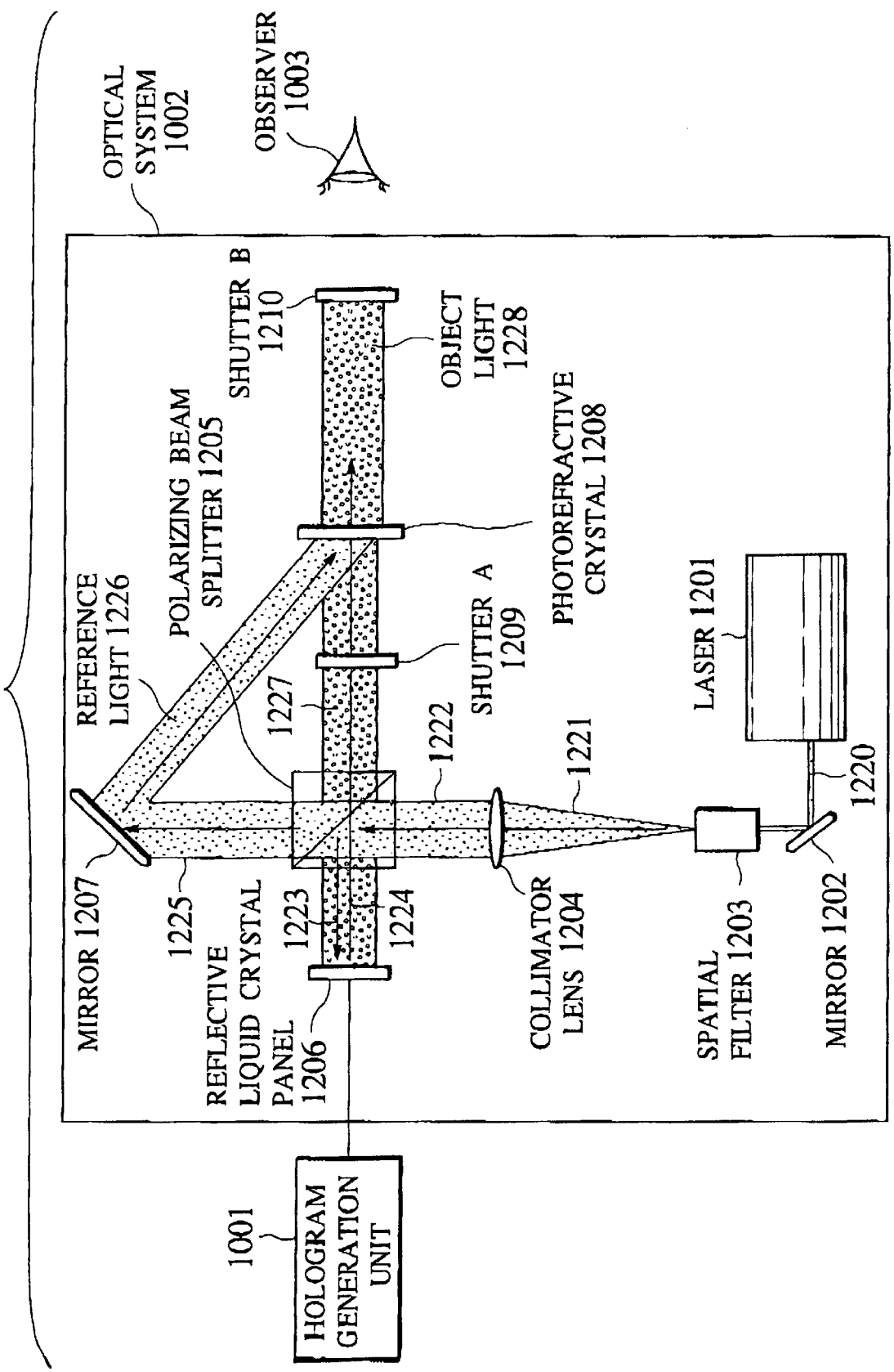
FIG. 8 is a block diagram showing a first exemplary schematic configuration of a three-dimensional image display device according to the second embodiment of the present invention.

FIG. 8 shows the first exemplary schematic configuration of a three-dimensional image display device according to the second embodiment. As shown in FIG. 8, this three-dimensional image display device generally comprises a hologram generation unit 1001 and an optical system 1002. The optical system 1002 comprises a laser 1201, a mirror 1202, a spatial filter 1203, a collimator lens 1204, a polarizing beam splitter 1205, a reflective liquid crystal panel 1206, a mirror 1207, a photorefractive crystal (element) 1208, a shutter A 1209 and a shutter B 1210.

FIG. 8 also shows an observer 1003, a laser beam 1220, a laser beam of a spherical wave 1221, a laser beam of a plane wave 1222, a light 1223 reflected by the polarizing beam splitter 1205, a light 1224 reflected by the reflective liquid crystal panel 1206, a light 1225 transmitted through the polarizing beam splitter 1205, a reference light 1226 (a light 1225 as reflected by the mirror 1207), a light 1227 reflected by the reflective liquid crystal panel 1206 and transmitted through the polarizing beam splitter 1205, and an object light 1228 transmitted through the photorefractive crystal 1208.

In this three-dimensional image display device, the reflective liquid crystal panel 1206 is used as a display device, and strontium barium niobate (SrBaNbO) is used as the photorefractive crystal 1208. A laser beam emitted from the laser 1201 is used as the reference light (non-scattered light), which is split into two optical paths 1223 and 1225 by the polarizing beam splitter 1205, and the non-scattered light (reference light) 1223 reflected by the polarizing beam splitter 1205 is irradiated onto the reflective liquid crystal panel 1206.

In the optical system 1002 of this three-dimensional image display device, the non-scattered light (reference light) 1225 transmitted through the polarizing beam splitter 1205 can be utilized as the reference light 1226 to be irradiated onto the photorefractive crystal 1208 via the mirror 1207.

Figure 9:
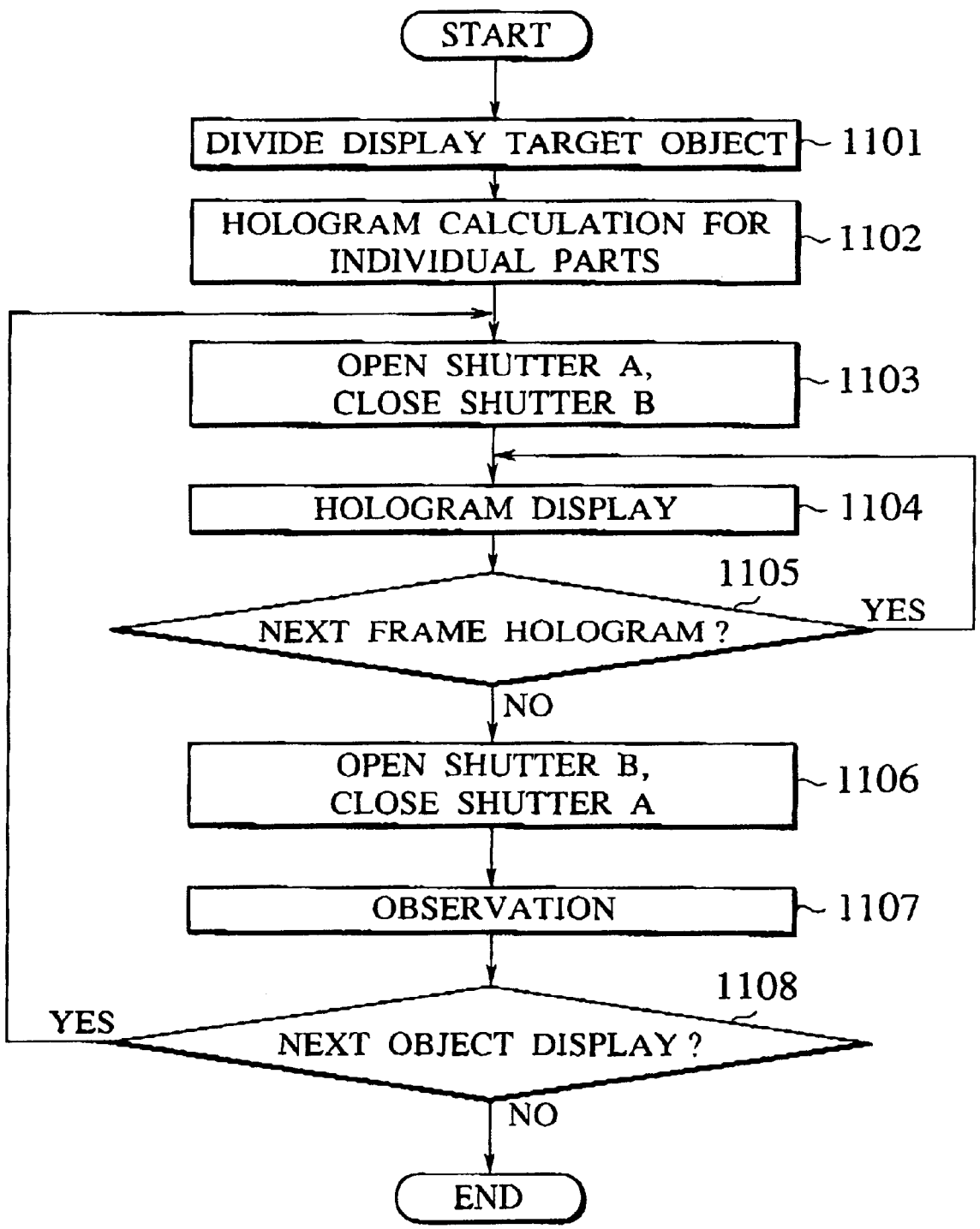
FIG. 9 is a flow chart for an operation of the three-dimensional image display device of FIG. 8.

Now, the operation of this three-dimensional image display device will be described with reference to the flow chart of FIG. 9.

First, the display target object is divided into four parts (step 1101). For example, in the case of displaying an object comprising four characters "HOLO", this object is divided into four parts "H", "O", "L" and "O" each comprising one character. Then, for each of these parts, a respective hologram to be generated at a position of the reflective liquid crystal panel 1206 is calculated (step 1102). Here, these four holograms will be labelled as frame1, frame2, frame3 and frame4. These individual frames are then sequentially displayed on the reflective liquid crystal panel 1206. Here, the light 1224 reflected by the reflective liquid crystal 1206 passes through the polarizing beam splitter 1205 and propagates into a direction of the photorefractive crystal 1208. The scattered light 1227 transmitted through the polarizing beam splitter 1205 is propagated inside the photorefractive crystal 1208. Here, the reference light 1226 is also propagated inside the photorefractive crystal 1208 at the same time so that a standing wave (interference fringe) is generated by the reference light 1226 and the scattered light 1227, and the interference fringe is recorded in the photorefractive crystal 1208.

By sequentially displaying the holograms of frame1 to frame4 on the reflective liquid crystal panel 1206, the interference fringes corresponding to these four frames will be multiply recorded inside the photorefractive crystal 1208 (steps 1104, 1105). During the recording, the shutter A 1209 is opened but the shutter B 1210 is closed so that the observer 1003 will not observe the light 1228 reflected by the reflective liquid crystal panel 1206 directly (step 1103).

After recording these four frames, the irradiation of the scattered light 1227 is blocked by closing the shutter A 1209 such that only the reference light 1226 is irradiated while the shutter B 1210 is opened (step 1106), so that the observer 1003 observes the object light 1228 through the photorefractive crystal 1208, and senses the object image such as four characters "HOLO", for example (step 1107). In the case of displaying a next object, the steps 1101 to 1107 are repeated (step 1108).

At this point, the interference fringes recorded in the photorefractive crystal 1208 are erased by either irradiating only the reference light 1226 for a longer time or by increasing the irradiation intensity of the reference light 1226.

Figure 10:
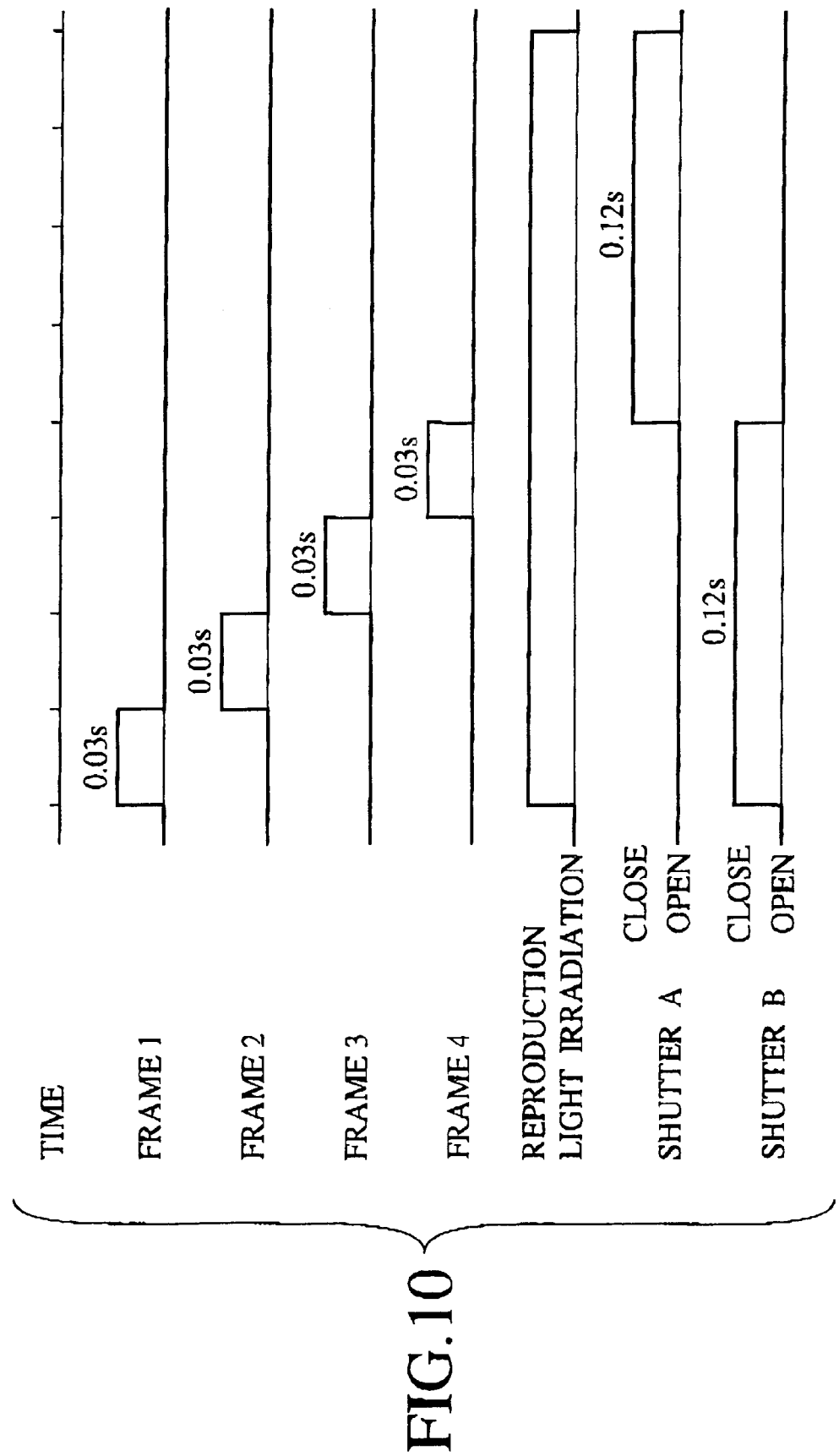
FIG. 10 is a timing chart for a control sequence in an operation of the three-dimensional image display device of FIG. 8.

FIG. 10 shows a time sequence indicating the irradiation order. For example, the frame1 is displayed for 0.03 seconds on the reflective liquid crystal panel 1206, then the frame2 is displayed for a next 0.03 seconds, and so on, Also, at the same time, the reference light (reproduction light) is continually irradiated. While irradiating frame1 to frame4, the shutter A 1209 is opened but the shutter B 1210 is closed. By repeating this sequence sequentially, the reproduced images ("H", "O", "L", "O", for example) of the multiply recorded frame1 to frame4 can be observed as a single object.

Note that time values given in this time sequence are just examples, which can be suitably changed according to the number of objects and the image switching rate of the display device, so that these values do not limit the present invention.

Figure 11:
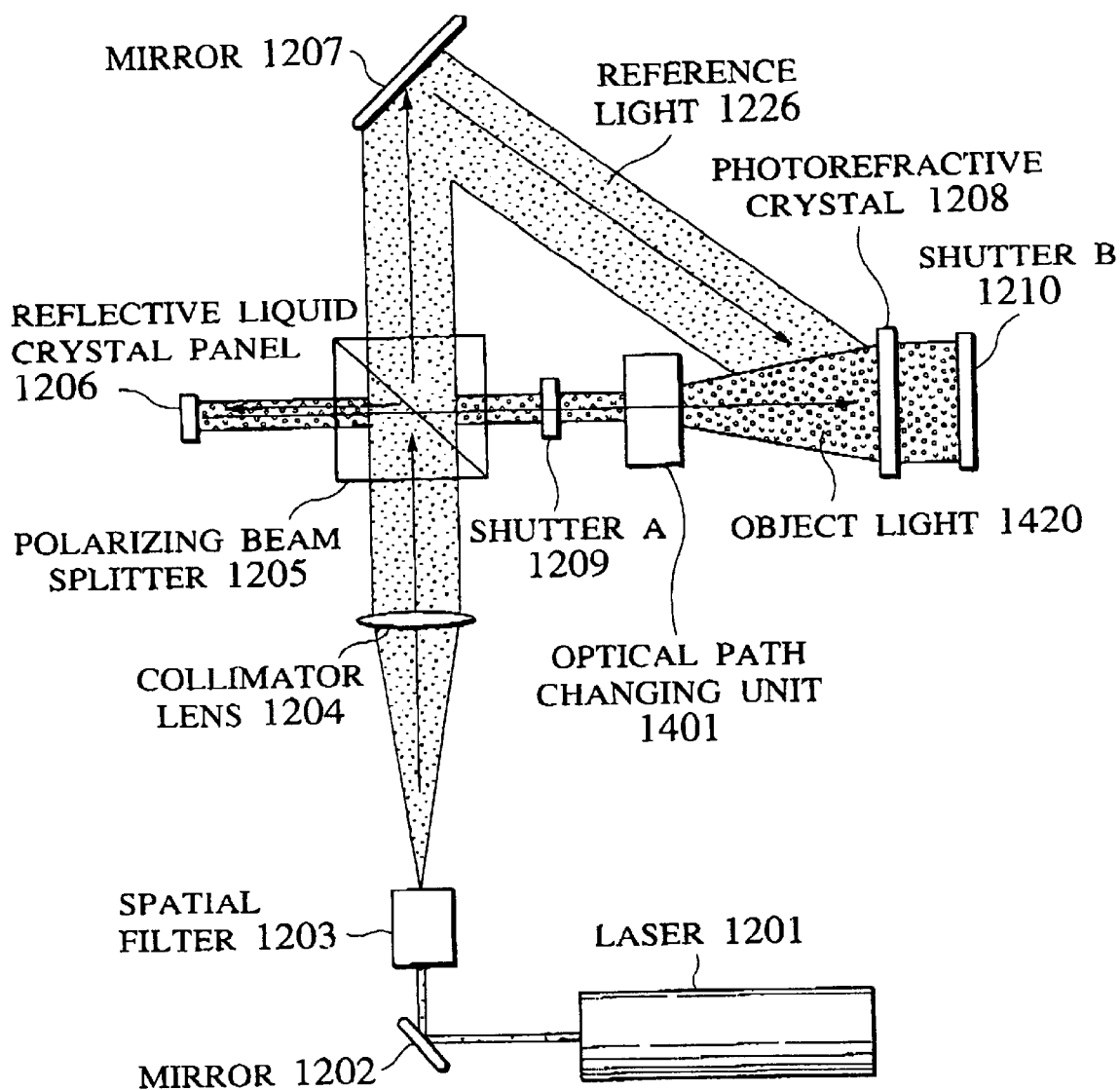
FIG. 11 is a block diagram showing a second exemplary schematic configuration of a three-dimensional image display device according to the second embodiment of the present invention.

Next, FIG. 11 shows a second exemplary schematic configuration of a three-dimensional image display device according to the second embodiment. As shown in FIG. 11, this three-dimensional image display device differs from that of FIG. 8 in that an optical path changing unit 1401 is additionally provided in the optical system 1002 similar to that of FIG. 8.

Figure 12:
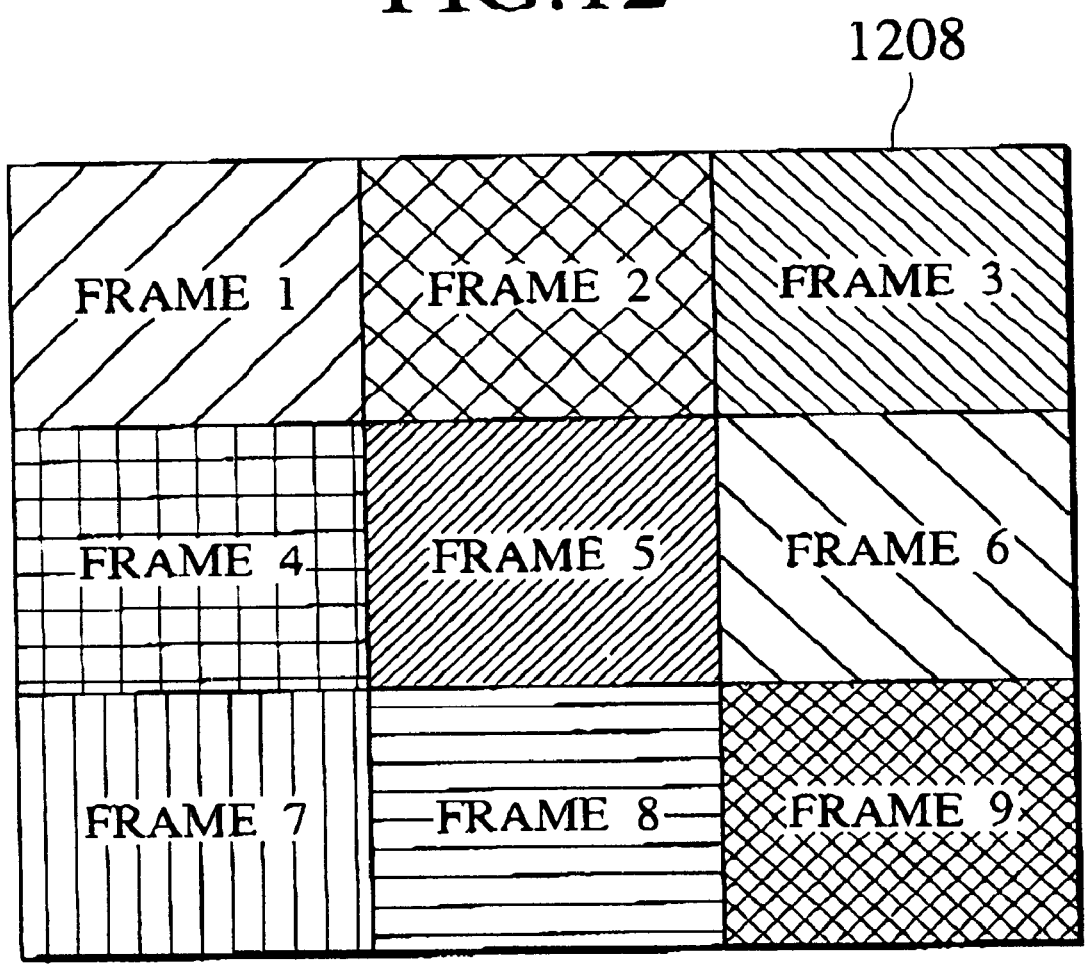
FIG. 12 is a diagram showing irradiation positions of different frames with respect to a photorefractive crystal in the three-dimensional image display device of FIG. 11.

Namely, in this three-dimensional image display device, the optical path changing unit 1401 functions to irradiate the scattered light (object light) 1420 reflected by the reflective liquid crystal panel 1206 onto different portions of the photorefractive crystal 1208. For example, the optical path changing unit 1401 can be formed by two mirrors, including a galvano mirror which causes the reflected light to scan along the vertical direction, and a polygon mirror which causes the reflected light to scan along the horizontal direction, such that the entered light can be irradiated at nine different positions as shown in FIG. 12, for example.

Suppose that the object to be displayed is represented by nine holograms, for example. In this case, the scattered light obtained by irradiating frame1 on the reflective liquid crystal panel 1206 will be irradiated to a portion corresponding to frame1 in FIG. 12. Thereafter, similarly, the interference fringes generated by the scattered lights for the other frames are sequentially recorded in the photorefractive crystal 1208. After all the frames are recorded, the object image is observed as in the step 1107 of FIG. 9.

As described, according to the second embodiment, it becomes possible to reproduce three-dimensional images in wide view field, by using a display device such as an electronic display device having a limitation on the resolution.

Note that the electronic display device is an example of a rewritable display device, such as a liquid crystal panel. In general, the resolution of such an electronic display device is much coarser than suitable for displaying the hologram, so that it has been impossible to obtain a clear reproduced image as in the case of the hologram of a photograph. In other words, the electronic display device has been capable of reproducing only the on-axis type hologram.

According to the second embodiment described above, the on-axis type hologram reproduced by the electronic display device can be recorded in the photorefractive crystal and then reproduced in a form of the off-axis type hologram. In other words, it becomes possible to reproduce only the display target object clearly, without allowing the light transmitted through the hologram (the electronic display device) to enter directly into the eyes.

The difference between the on-axis type hologram and the off-axis type hologram is whether the object light and the reference light (non-scattered light) are on the same optical axis or not. At a time of recording the interference fringes in the photorefractive crystal, the object light and the reference light have different optical axes so that it is the off-axis type. The on-axis type and the off-axis type also differs in that the off-axis type requires to record the fringes at high spatial frequency than the on-axis type. For this reason, the display device with a low spatial frequency such as liquid crystal display (LCD) cannot display the off-axis type.

In contrast, the photorefractive crystal has a recording density greater than the hologram plate, i.e., the photorefractive crystal is capable of recording at very high spatial frequency, so that it is possible to record the off-axis type.

In the on-axis type, both the object light and the reference light will be entered into the eyes at the same time, so that a region in which the object is observable is very narrow. (In practice, this is true to such an extent that an object image can be seen only in a region right next to the reference light.) On the other hand, in the off-axis type, the reference light will go out of the visual field, so that only the object light can be observed.

Also, the electronic display device is rewritable at high speed so that the image sequence of holograms can be sequentially displayed. However, the electronic display device has a limitation on the displayable gray scale values, i.e., the dynamic range, so that the number of objects (the number of point light sources, for example) that can be displayed simultaneously is limited.

In the second embodiment described above, even when the number of objects that can be displayed simultaneously is small, a plurality of holograms each corresponding to the small number of objects are displayed in time sharing basis. In other words, many objects are multiply displayed by integrating them along the time direction. On the other hand, the the photorefractive crystal used for recording the interference fringes is an element capable of multiple recording. Consequently, as described above, the scattered lights obtained by the display of the hologram image sequence representing a plurality of objects are multiply recorded in the photorefractive crystal as the interference fringes.

Then, only the multiply recorded result alone is observed by opening a shutter. For this reason, even though the electronic display device has a low dynamic range, it is possible to observe a high resolution image (a plurality of objects) through the photorefractive crystal.

Also, by irradiating only the reference light (non-scattered light) for a longer time or increasing the intensity of the reference light, it is possible to erase the once recorded interference fringes. Thus, by repeating a series of operations for recording and erasing, it is possible to reproduce the video hologram.

Also, even though the electronic display device has a small display area, the object is spatially divided and the interference fringes corresponding to divided regions are sequentially recorded. Usually, the electronic display device require an enormous amount of data when a size of the image to be displayed becomes large, so that there is a limitation on the number of pixels that can be displayed dynamically. In the case of holograms, a pitch of the display pixels is the key factor so that enlarging the screen using the fixed number of pixels does not lead to enlarging the visual field, and rather makes it difficult to form an image.

Now, the first embodiment described above is directed to a method for recording holograms by using a photorefractive recording medium (photorefractive crystal) in which the scattered light of the object is reproduced by a display device, and irradiated onto the photorefractive recording medium while the reference light is irradiated onto the photorefractive recording medium from a different angle and the interference fringes generated by wavefronts of two lights are recorded. Here, the photorefractive crystal has a property that the contrast of the recorded image is changed according to the intensity of the recording light, so that it is preferable to use the light of higher intensity for the recording. For this reason, the intensity of the light is increased using the condensing effect of a lens at a time of recording into the photorefractive crystal.

Figure 13:
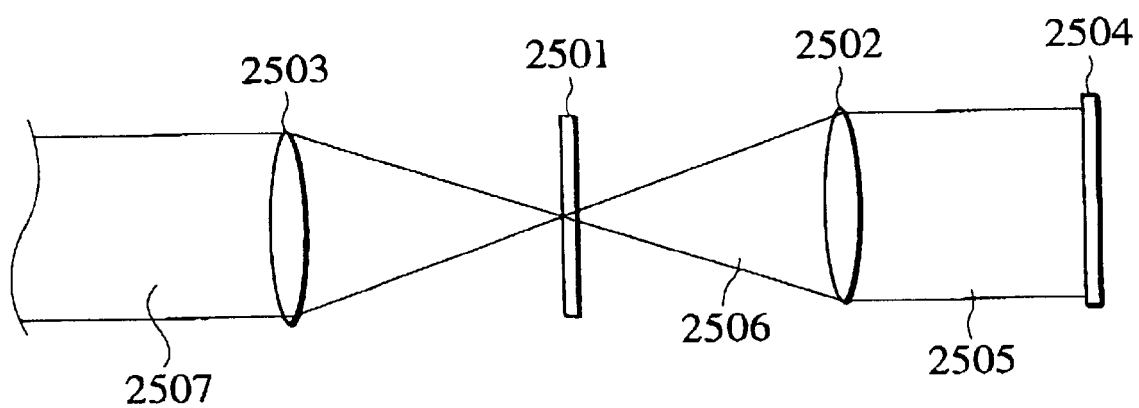
FIG. 13 is a schematic diagram for explaining an operational principle of the first embodiment of the present invention.

Namely, as shown in FIG. 13, in order to increase the intensity of the light to be recorded in a photorefractive element 2501, a condenser lens 2502 is provided. This condenser lens 2502 is a lens having a focal point at a portion of the photorefractive element 2501, and a scattered light 2505 generated by a display device 2504 is condensed onto the photorefractive element 2501 as indicated by 2506. By the effect of this condensor lens 2502, the intensity of the scattered light 2505 becomes high so that the time required in recording the hologram in the photorefractive element 2501 can be shortened and it becomes possible to reproduce images in higher contrast.

The images recorded in the photorefractive element 2501 is converted into a collimated light 2507 by a lens 2503 such that it can be sensed by the observer as a light propagated straight from the display device 2504. Here, the reproduced image will be upside down, but by inverting the image at a time of displaying at the display device 2504, the observer can observe the image in a normal direction.

However, when three-dimensional video is to be displayed in the above method, a time for recording the hologram for one frame and a time for erasing the recorded hologram will be necessary for each frame of the video, so that the refresh rate of the video becomes low and the reproduced video has considerable flickering.

Also, the focal point distance and position of the condensor lens 2502 and the lens 2503 are fixed, so that when the enlargement of the visual field is required, it is necessary to take a measure such as changing the optical path mechanically. However, even when the optical path is changed mechanically, the visual field is still limited by the resolution (pixel pitch) of the display device, so that it is difficult to reproduce the video in wide view field at high resolution.

The third and fourth embodiments described below are directed to configurations for resolving these problems.

Referring now to FIG. 14 to FIG. 19, the third embodiment of a method and an apparatus for three-dimensional holographic display according to the present invention will be described in detail.

Figure 14:
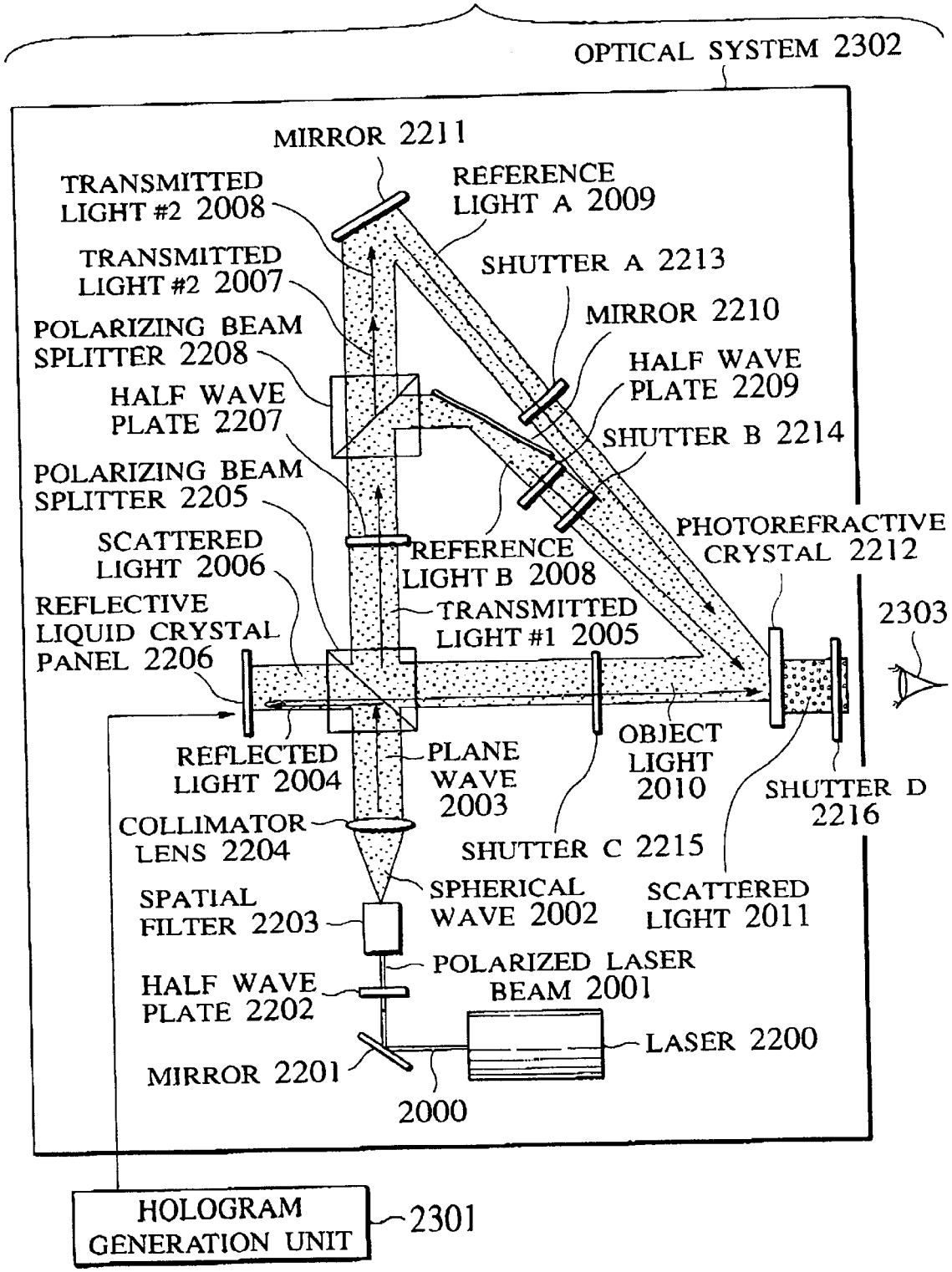
FIG. 14 is a block diagram showing an exemplary schematic configuration of a three-dimensional image display device according to the third embodiment of the present invention.
Figure 15:
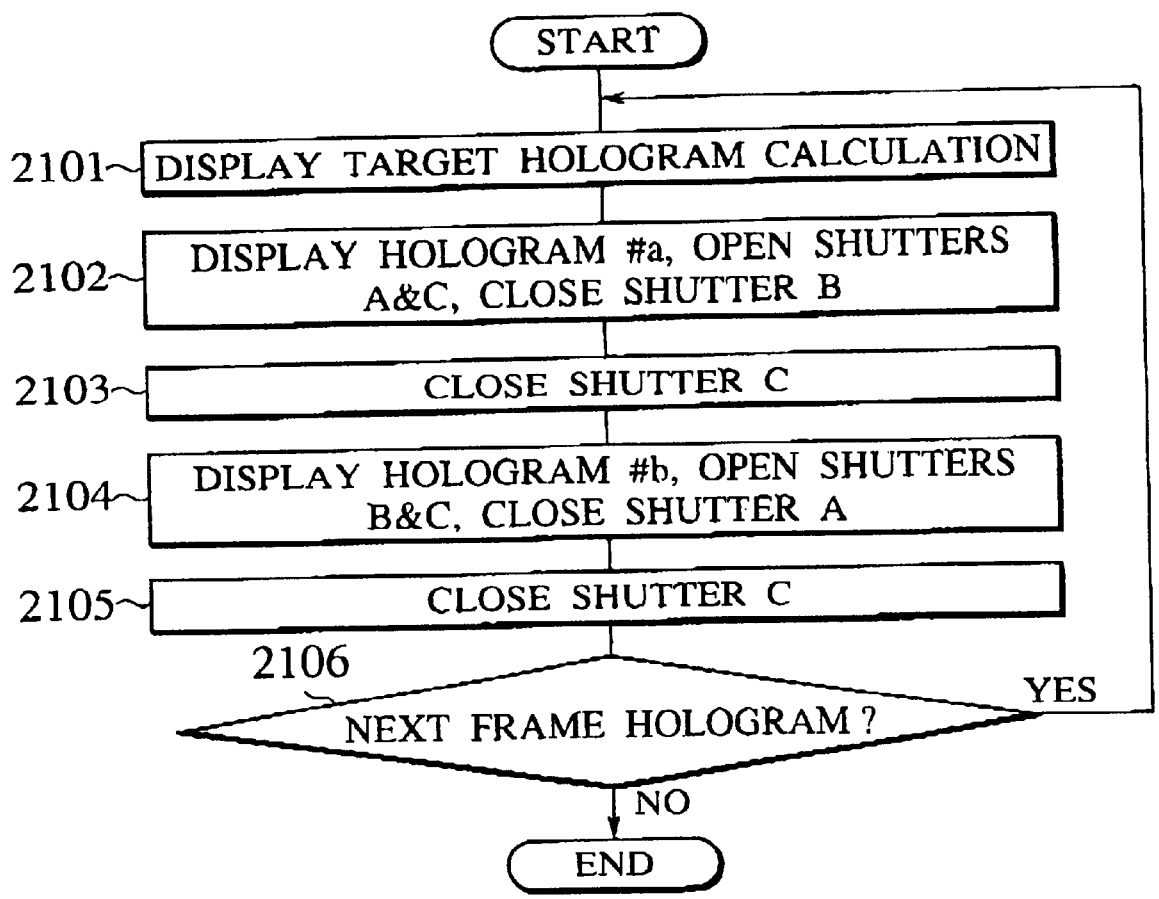
FIG. 15 is a flow chart for an operation of the three-dimensional image display device of FIG. 14.

FIG. 14 shows an exemplary configuration of a three-dimensional image display device of the third embodiment, and FIG. 15 shows a processing procedure of this three-dimensional image display device.

The three-dimensional image display device of FIG. 14 is directed to an exemplary case that uses an optical system utilizing a laser beam having a vertically polarized output, and two reference lights with different incident angles. In general, a plurality of reference lights (non-scattered lights) with different incident angles can be used at a time of recording holograms in the photorefractive medium, and the number of reference lights to be used is not necessarily limited to two according to the third embodiment.

This three-dimensional image display device generally comprises a hologram generation unit 2301 and an optical system 2302. The optical system 2302 comprises a laser 2200, a mirror 2201, a half wave plate 2202, a spatial filter 2203, a collimator lens 2204, a polarizing beam splitter 2205, a reflective liquid crystal panel 2206, a half wave plate 2207, a polarizing beam splitter 2208, a half wave plate 2209, a mirror 2210, a mirror 2211, a photorefractive crystal (photorefractive medium) 2212, a shutter A 2213, a shutter B 2214, a shutter C 2215, and a shutter D 2216.

In this three-dimensional image display device, strontium barium niobate (SrBaNbO) is used as the photorefractive crystal 2212. A laser beam emitted from the laser 2200 is split into a first optical path and a second optical path by the first polarizing beam splitter 2205, and the laser beam split into the second optical path is further split into two by the second polarizing beam splitter 2208 and used as the reference light A 2009 and the reference light B 2008 to be irradiated onto the photorefractive crystal 2212.

In this configuration, the laser beam 2000 emitted from the laser 2200 is entered into the half wave plate 2202 via the mirror 2201. The half wave plate 2202 changes an angle (slope) of the polarization plane of the laser beam 2000. Here, the polarization plane is adjusted such that the reference light A 2009, the reference light B 2008, and the object light 2010 will have the same intensity.

The polarized laser beam 2001 is then converted into a spherical wave 2002 by the spatial filter 2203. The spherical wave 2002 is then converted into a plane wave 2003 by the collimator lens 2204, and entered into the polarizing beam splitter 2205. Here, a component having a vertical polarization plane is reflected by the polarizing beam splitter 2205, and irradiated onto the reflective liquid crystal panel 2206 as the reflected light 2004.

The light (scattered light) 2006 reflected by the reflective liquid crystal panel 2206 has the vertical polarization converted into the horizontal polarization because of the property of the liquid crystal, so that it is transmitted through the polarizing beam splitter 2205 and irradiated onto the photorefractive crystal 2212 as the object light 2010.

Also, a component of the plane wave 2003 having a horizontal polarization plane is transmitted through the polarizing beam splitter 2205 and propagated straight as the transmitted light 2005. The transmitted light 2005 has only a horizontal polarization plane, but this polarization plane is polarized again by the half wave plate 2207, and the resulting light is entered into the second polarizing beam splitter 2208.

Here, a component having a horizontal polarization plane is propagated straight as the transmitted light 2007, and irradiated onto the photorefractive crystal 2212 via the mirror 2211 and the shutter A 2213 as the reference light A 2009.

Also, a component of the light entered into the second polarizing beam splitter 2208 having a vertical polarization plane is reflected by the polarizing beam splitter 2208 as the reference light B 2008, and converted into the reference light having only the horizontal polarization component by the half wave plate 2209.

The object light 2010 interfere with the reference light A 2009 and the reference light B 2008 and the resulting interference fringes are recorded inside the photorefractive crystal 2212 as the hologram.

The observer 2003 can sense the holographic image as the scattered light 2011 due to the interference fringes recorded in the photorefractive crystal 2212 is entered into the eyes when the reference light A 2009 or the reference light B 2008 alone is irradiated. Here the shutter D 2216 is controlled to be in an open state only at a time of observing the holographic image.

Also, the shutter A 2213, the shutter B 2214, and the shutter C 2215 are provided on the optical paths of the reference light A 2009, the reference light B 2008, and the object light 2010, respectively.

Next, the operation of this three-dimensional image display device for an exemplary case of displaying holograms for scene #1 and scene #2 will be described with references to FIG. 15 and FIG. 16.

First, the holograms #a and #b of the display target corresponding to the individual scenes are calculated in advance (step 2101). For this hologram calculation, it is possible to use the known methods such as a method for carrying out the Fresnel transformation based on the point light sources and a method for adding phases to the Fourier transformed result.

Figure 16:
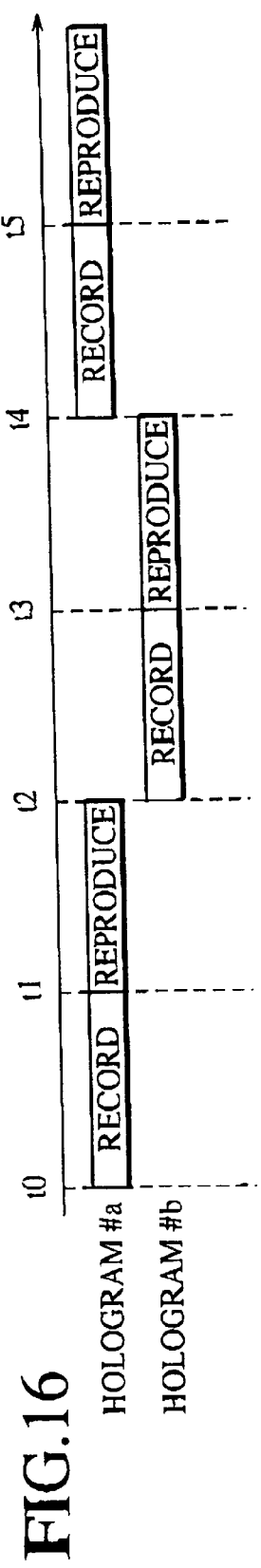
FIG. 16 is a timing chart for one exemplary operation of the three-dimensional image display device of FIG. 15.

Next, from a time t0 to a time t1 of FIG. 16, the hologram #a corresponding to the scene #1 is displayed on the reflective liquid crystal panel 2206. At this point, the shutter A 2213 and the shutter C 2215 are controlled to be open, and the shutter B 2214 is controlled to be closed (step 2102).

In this way, the object light (scattered light) 2010 from the hologram #a and the reference light A 2009 are simultaneously irradiated onto the photorefractive crystal 2212 so that the interference fringes for the hologram #a are recorded.

Next, from a time t1 to a time t2 of FIG. 16, the shutter C 2215 is closed and only the reference light A 2009 is irradiated onto the photorefractive crystal 2212 (step S2103) such that the scene #1 can be observed.

Next, from a time t2 to a time t3 of FIG. 16, the hologram #b corresponding to the scene #2 is displayed on the reflective liquid crystal panel 2206. At this point, the shutter B 2214 and the shutter C 2215 are controlled to be open, and the shutter A 2213 is controlled to be closed (step 2104).

In this way, the object light (scattered light) 2010 from the hologram #b and the reference light B 2008 are simultaneously irradiated onto the photorefractive crystal 2212 so that the interference fringes for the hologram #b are recorded. Here, the interference fringes for the hologram #a of the scene #1 that was recorded earlier will be erased.

Next, from a time t3 to a time t4 of FIG. 16, the shutter C 2215 is closed and only the reference light B 2008 is irradiated onto the photorefractive crystal 2212 (step S2105) such that the scene #2 can be observed.

If there is a next scene, the similar processing is repeated from the step 2101 (step S2106).

By repeating the above processing, it is possible to sequentially display holograms of different scenes so that it is possible to realize the holographic video display.

Figure 17:
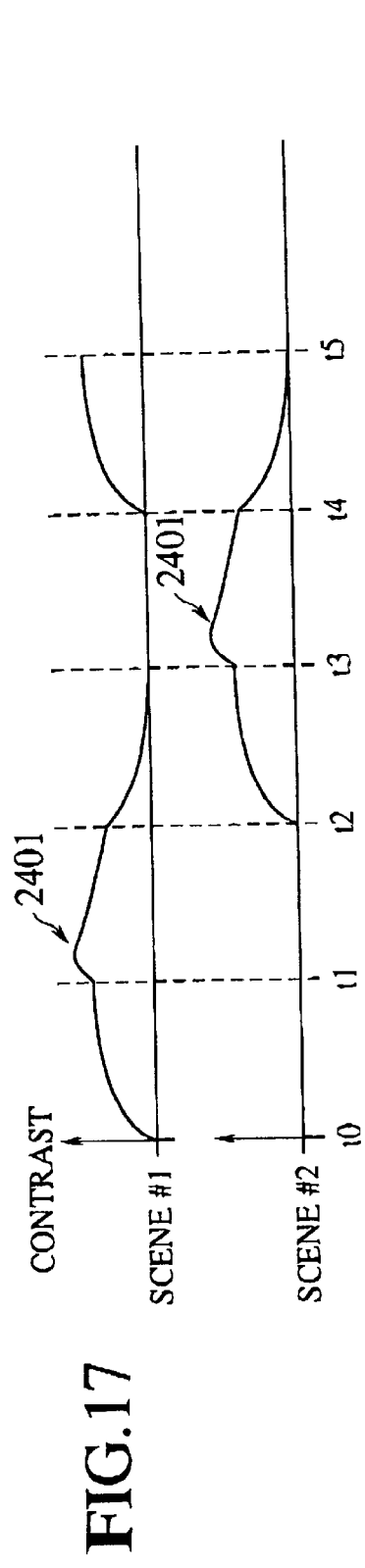
FIG. 17 is a graph showing an exemplary contrast change in time for scenes displayed by the three-dimensional image display device of FIG. 15.

FIG. 17 shows a contrast of the reproduced image on a vertical axis and a time on a horizontal axis. At a stage from a time t0 to a time t1 of FIG. 16, the image of the scene #1 is gradually recorded, and at a stage where the shutter C 2215 is closed, the reproduced image is reproduced for a prescribed period of time (from t1 to t2). At a time t2, the recording of the hologram corresponding to another scene #2 is started using another reference light. Then, between t2 and t3, the contrast of the image of the scene #2 to be recorded is gradually increased, while the contrast of the hologram for the scene #1 that was recorded earlier is gradually decreased. Namely, the hologram for the scene #1 is gradually erased. Between t3 and t4, only the reference light B is irradiated so that only the scene #2 is reproduced.

Here, the contrast is increased temporarily at a time of reproduction (at a portion 2401 in FIG. 17) because, when only the reference light is irradiated, the object light generated by the interference fringes recorded in the photorefractive crystal 2212 interfere with the reference light such that the contrast of the image is increased. By irradiating the reference light alone, the contrast is gradually decreased. Then, by irradiating another reference light at a different incident angle, the recorded image (interference fringes) is completely erased.

Figure 18:
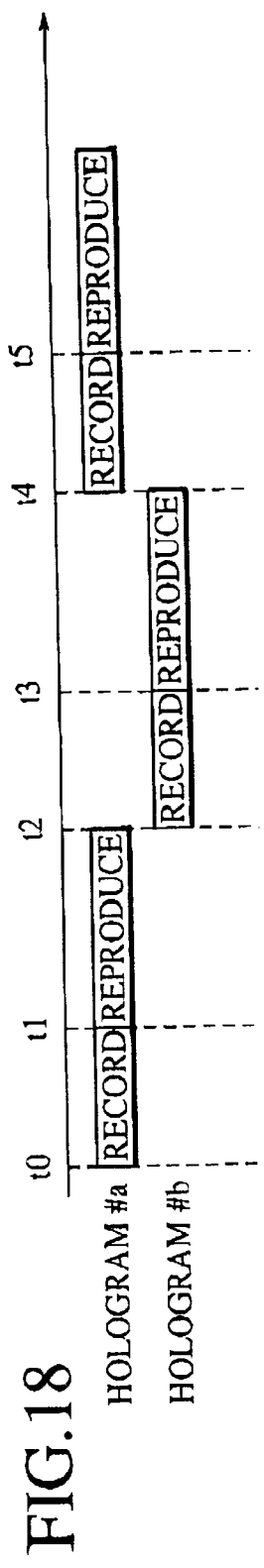
FIG. 18 is a timing chart for another exemplary operation of the three-dimensional image display device of FIG. 15.

Note that FIG. 16 shown an exemplary case where a time for the recording is about the same as a time for the reproduction, but it is also possible to make the time for the recording shorter and the time for the reproduction longer as shown in FIG. 18. This can easily be realized by providing a polarization plate capable of time controlling the angle of the polarization plane, between the half wave plate 2202 and the mirror 2201 in FIG. 14, such that the light intensity becomes higher at a time of the recording than at a time of the reproduction.

Also, by providing the shutter D 2216 between the photorefractive crystal 2212 and the observer 2003 and controlling the shutter 2215 to be closed only at a time of the recording, it is possible to observe only the reproduced image without observing the light that is transmitted through the photorefractive crystal 2212 at a time of the recording directly.

Also, by selecting a time interval that enables the video display such as 30 frames/sec, for example, for the opening and closing time interval for the shutter A 2213, the shutter B 2214, and the shutter C 2215, it becomes possible to realize the video display.

Figure 19:
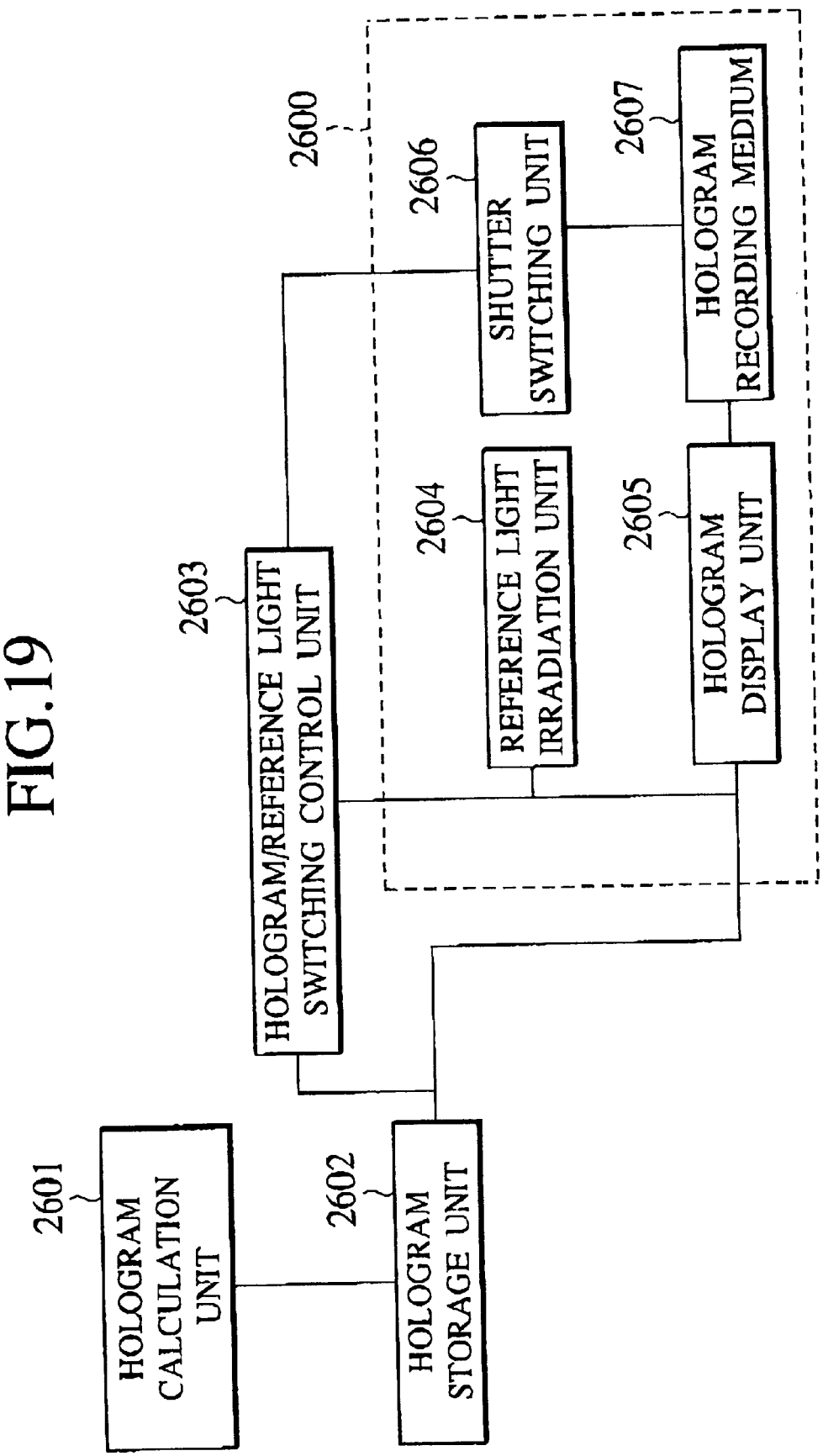
FIG. 19 is a block diagram showing a functional configuration of the three-dimensional image display device of FIG. 15.

FIG. 19 shows a functional configuration of the three-dimensional image display device of the third embodiment, which comprises a hologram calculation unit 2601, a hologram storage unit 2602, a hologram/reference light switching control unit 2603, a reference light irradiation unit 2604, a hologram display unit 2605, and a hologram recording medium 2607.

The hologram calculation unit 2601 corresponds to the hologram generation unit 2301 of FIG. 14. The hologram storage unit 2602 is a memory device for temporarily storing the calculated hologram image. The hologram display unit 2605 corresponds to the reflective liquid crystal panel 2206 of FIG. 14. The reference light irradiation unit 2604 corresponds to the irradiation optical system of the reference light A 2009 and the reference light B 2008 in FIG. 14. The hologram recording medium 2607 corresponds to the photorefractive crystal 2212 of FIG. 14. The hologram/reference light switching control unit 2603 is a unit for carrying out the switching control of the hologram to be displayed on the hologram display unit 2605 and the switching control of the reference light to be irradiated by the reference light irradiation unit 2604. The shutter switching unit 2606 is a unit for carrying out the switching control of the shutters A, B, C and D of FIG. 14. In FIG. 19, a portion 2600 corresponds to the optical system 2002 of FIG. 14.

The operation of the three dimensional image display device in this configuration is as follows.

First, the hologram images calculated in advance by the hologram calculation unit 2601 are temporarily stored in the hologram storage unit 2602. The stored hologram images are displayed on the hologram display unit 2605 under the control of the hologram/reference light switching control unit 2603, while the shutters are controlled by the shutter switching unit 2606 in synchronization with the switching of the displayed image. and the reference lights A and B are alternately switched and irradiated onto the hologram recording medium 2607 from the reference light irradiation unit 2604.

As described, according to the third embodiment, the irradiation optical system for a plurality of reference lights with different incident angles is provided, and these plurality of reference lights are switched in time sharing basis while carrying out the recording and the reproduction of holograms in time sharing basis, and the image of the previous display timing is erased at a time of recording the image of a next display timing, so that there is no need to provide a time for erasing the recorded image separately. For this reason, it becomes possible to increase the refresh rate of holograms of the display target so that it becomes possible to display three-dimensional images using holograms which have less flickering.

Also, by increasing the intensity of the reference light higher at a time of recording than at a time of reproducing, it is possible to shorten the recording time further, so that the refresh rate can be increased even further.

In the third embodiment, the recording medium having the photorefractive effect is also utilized as a photorefractive medium capable of multiple recording. Namely, this is an element that can record plural information by using different incident angles. Using this element, the hologram recording for reproducing one image is sequentially carried out by changing the incident angle of the reference light. At a time of reproduction, different images can be reproduced by irradiating the reference lights at different incident angles.

In the usual case of recording different images using the reference light of the same incident angle, there are cases where the object light is generated by the interference fringes recorded earlier and this generated object light and the object light to be newly recorded are observed simultaneously such that it appears as double image caused by afterimage.

In this regard, by changing the angle of the reference light, it becomes possible to reproduce the image without any doubling with the previous image. In addition, the previously recorded image can be erased in shorter time by irradiating the reference light with a different incident angle than by irradiating the reference light with the same incident angle as used for the recording, so that the refresh rate can be increased and the three-dimensional image display with less flickering can be realized.

Also, because of the property of the photorefractive crystal, the recording time and the erasing time are proportional to the intensity of the light irradiated, so that by increasing the intensity of the light at a time of the recording than at a time of reproducing, it is possible to make the recording time shorter than the reproduction time. Consequently, three-dimensional image can be reproduced with less flickering in the case of repeating the recording and the reproduction.

Referring now to FIGS. 20A and 20B to FIG. 26, the fourth embodiment of a method and an apparatus for three-dimensional holographic display according to the present invention will be described in detail.

This fourth embodiment is directed to the realization of the three-dimensional holographic display with a wide view field using a compact configuration by providing one holographic optical element (HOE) for converting an optical path of the object light and converging the object light, on one side of the photorefractive medium, while also providing another HOE for converting an optical path of the transmitted light from the photorefractive medium into the same direction as the propagation direction of wavefronts emitted from the display device, on the opposite side of the photorefractive medium.

As a preliminary stage of the following description of the fourth embodiment, an exemplary method for manufacturing HOE to be used for an optical path conversion will be described first.

Figure 20A:
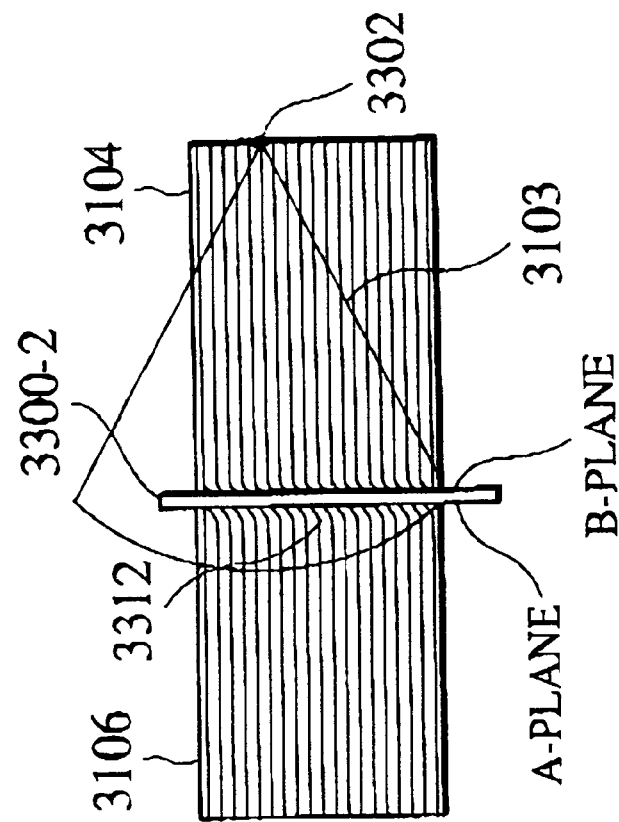
FIGS. 20A and 20B are diagrams for illustrating an exemplary method for manufacturing holographic optical elements used in the fourth embodiment of the present invention.
Figure 20B:
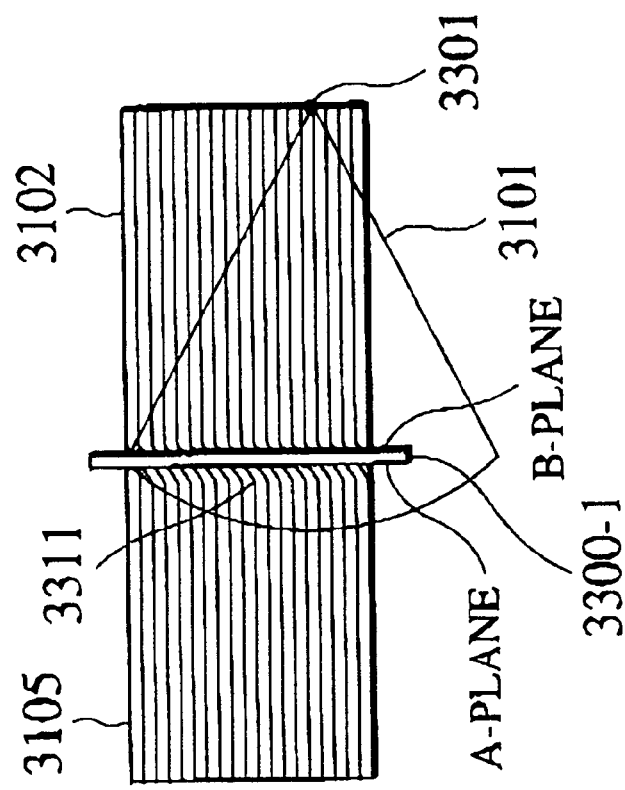

FIGS. 20A and 20B illustrate an exemplary method for manufacturing HOE. As shown in FIG. 20A, when a spherical wave 3101 generated by a point light source 3301 and a plane wave 3102 are irradiated onto a hologram plate 3300-1, interference fringes 3311 are generated and these interference fringes 3311 are recorded on the hologram plate 3300-1.

Similarly, as shown in FIG. 20B, interference fringes 3312 due to a spherical wave 3103 generated by a point light source 3302 at another incident position and a plane wave 3104 are recorded on a hologram plate 3300-2.

Here, the recorded interference fringes 3311 and 3312 have a function of a diffraction grating so that they can be utilized for changing wavefronts of lights. Namely, in the case of the interference fringes (diffraction grating) 3311 recorded on the hologram plate 3300-1, by irradiating only the spherical wave 3101 thereon, the spherical wave 3101 can be converted into a plane wave 3105 that propagates in a direction into which the plane wave 3102 has transmitted through the hologram plate 3300-1.

Similarly, by irradiating only the spherical wave 3103 onto the hologram plate 3300-2, the spherical wave 3103 can be converted into a light wavefront which is equivalent to the plane wave 3106 obtained as the plate wave 3104 has transmitted through the hologram plate 3300-2.

Here, in order to simplify the explanation, a left side of the hologram plate 3300-1 of FIG. 20A will be referred to as A-plane and a right side of the hologram plate 3300-1 of FIG. 20A will be referred to as B-plane. Similarly, a left side of the hologram plate 3300-2 of FIG. 20B will be referred to as A-plane and a right side of the hologram plate 3300-2 of FIG. 20B will be referred to as B-plane. Now, when the plane wave 3105 is incident on the hologram plate 3300-1, this plane wave 3105 can be converted into the spherical wave 3101 that converges to a position of the point light source 3301 by the diffraction effect of the interference fringes 3311. Similarly, when the plane wave 3106 is incident on the hologram plate 3300-2, this plane wave 3106 can be converted into the spherical wave 3103 that converges to a position of the point light source 3302 by the diffraction effect of the interference fringes 3312.

Namely, the hologram plate 3300 can be used as an optical element that converts the spherical wave incident from the B-plane into the plane wave, and the plane wave incident from the A-plane into the spherical wave. In this fourth embodiment, the optical path conversion for the object light is carried out by providing such hologram plates 3300-1 and 3300-2 recording the interference fringes on both sides of the photorefractive medium, so as to realize the three-dimensional holographic display with a wide view field using a compact configuration.

Figure 21:
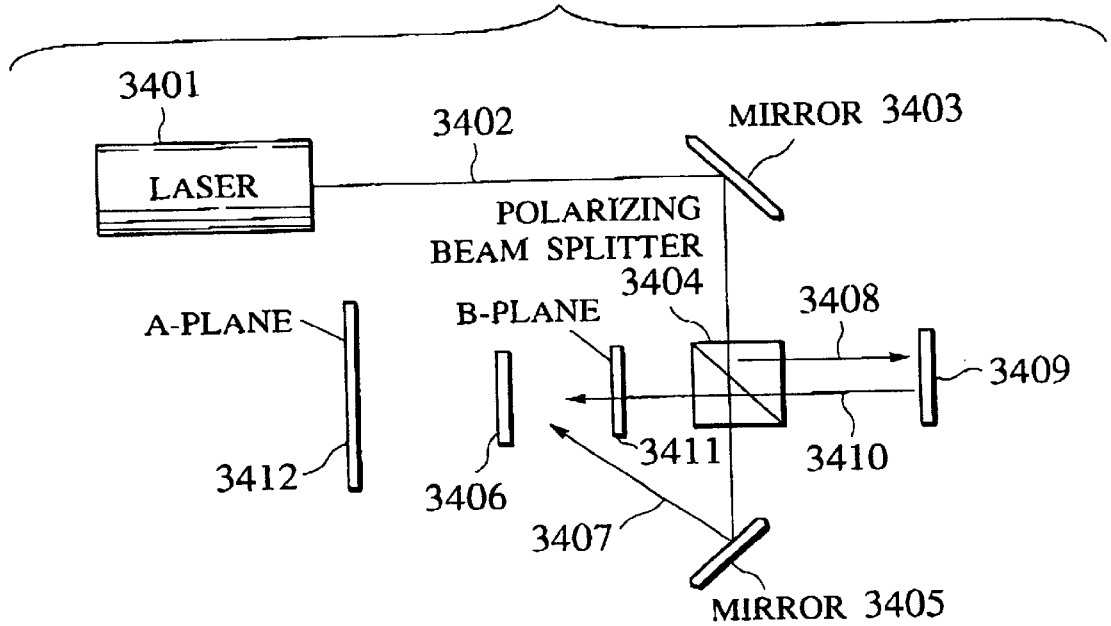
FIG. 21 is a block diagram showing an exemplary schematic configuration of a three-dimensional image display device according to the third embodiment of the present invention.

FIG. 21 shows a schematic configuration for realizing the three-dimensional holographic display using the above described HOE. In FIG. 21, a laser beam 3402 emitted from a laser beam generator 3401 is incident onto a polarizing beam splitter 3404 via a mirror 3404. Then, a component having a horizontal polarization plane is propagated straight and incident on a mirror 3405. A light reflected by the mirror 3405 is then irradiated as a reference light 3407 onto a photorefractive medium 3406 having the photorefractive effect.

On the other hand, a component having a vertical polarization plane is reflected by the polarizing beam splitter 3404 and irradiated onto a reflective liquid crystal panel 3409 as a reflected light 3408. A light (scattered light) 3410 reflected by this reflective liquid crystal panel 3409 has the vertical polarization component converted into the horizontal polarization component by the property of the liquid crystal, and is transmitted through the polarizing beam splitter 3404 and incident on HOE 3411 as the object light. A light transmitted through the HOE 3411 is irradiated onto the photorefractive medium 3406 and generates the interference fringes with the earlier mentioned reference light 3407. These interference fringes are recording a hologram generated by an object displayed on the display device (reflective liquid crystal panel) 3409.

In the fourth embodiment, two HOEs 3411 and 3412 are provided at two locations in front and behind of the photorefractive medium 3406 on the optical path of the transmitted light.

Figure 22:
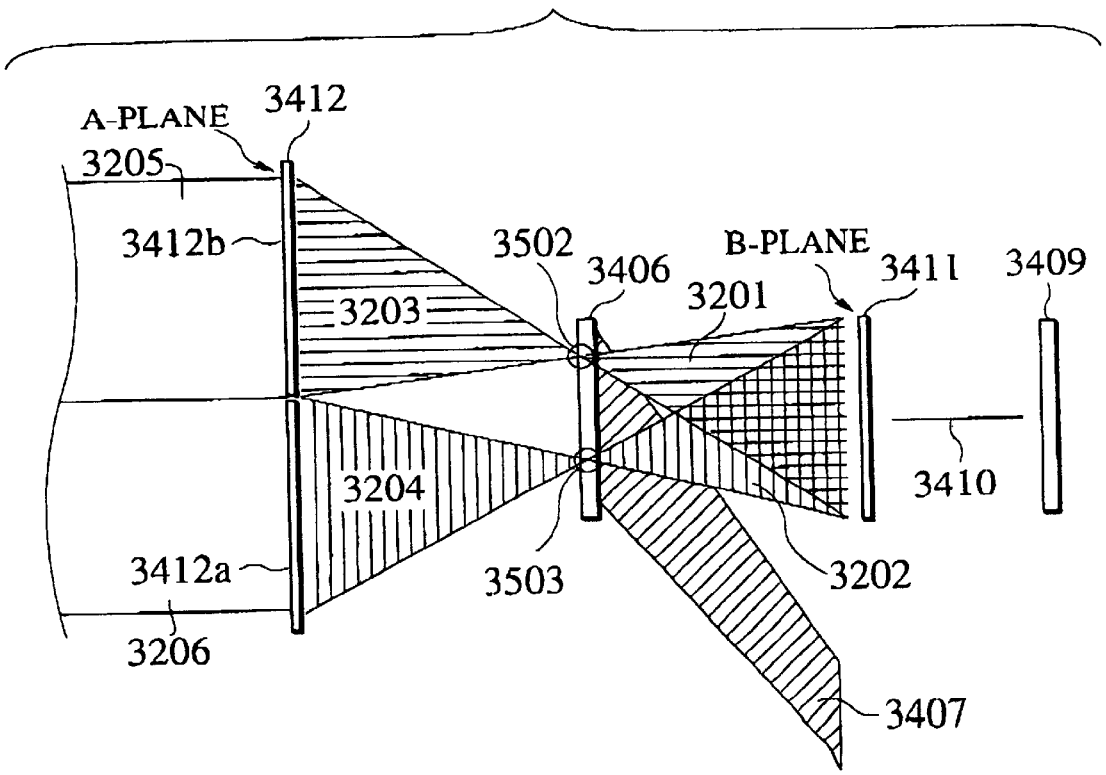
FIG. 22 is a diagram for illustrating a wavefront conversion by holographic optical elements in the three-dimensional image display device of FIG. 21.

FIG. 22 illustrates the wavefront conversion by these two HOEs 3411 and 3412. In FIG. 22, the display device 3409 displays a hologram, and the photorefractive medium 3406 having the photorefractive effect records the interference fringes generated by the interference between the light converging thereon by the HOE 3411 and the reference light 3407. The HOE 3412 on the reproduction side has a configuration formed by extracting (cutting) only portions 3412a and 3412b on which fringes are recorded from the hologram plates 3300-1 and 3300-2 described above, and arranging them along a vertical direction. The portion 3412a corresponds to the hologram plate 3300-1 and the portion 3412b corresponds to the hologram plate 3300-2. This reproduction side HOE 3412 plays a role of a projection screen.

The object light 3410 is converged at a position 3502 when the hologram plate 3300-2 is provided at a position of the HOE 3411, whereas the object light 3410 is converged at a position 3503 when the hologram plate 3300-1 is provided at a position of the HOE 3411.

Here, assuming that the reference light 3407 is continually irradiated onto the photorefractive medium 3406, if the hologram plate 3300-1 is provided at a position of the HOE 3411, the object light is incident on the A-plane so that the object light has its optical path changed and is converged at the position 3503 on the photorefractive medium 3406, and generates the interference fringes with the reference light 3407 which are recorded in the photorefractive medium 3406. Also, if the hologram plate 3300-2 is provided at a position of the HOE 3411, the object light is incident on the A-plane so that the object light has its optical path changed and is converged at the position 3502 on the photorefractive medium 3406, and generates the interference fringes with the reference light 3407 which are recorded in the photorefractive medium 3406. These recorded interference fringes are then incident on the B-plane of the portions 3412a and 3412b of the reproduction side HOE 3412 as spherical waves 3203 and 3204 by irradiating only the reference light 3407 on the photorefractive medium 3406, and then converted into plane waves 3205 and 3206 there such that they are sensed as the three-dimensional image by the observer. Consequently, by switching the recording side HOE 3411 from the hologram plate 3300-1 to the hologram plate 3300-2, or from the hologram plate 3300-2 to the hologram plate 3300-1 at a time interval shorter than a time by which the afterimage disappear from the eyes of the observer, it becomes possible for the observer to sense a large three-dimensional image obtained by simultaneously displaying the plane waves 3205 and 3206.

Figure 23:
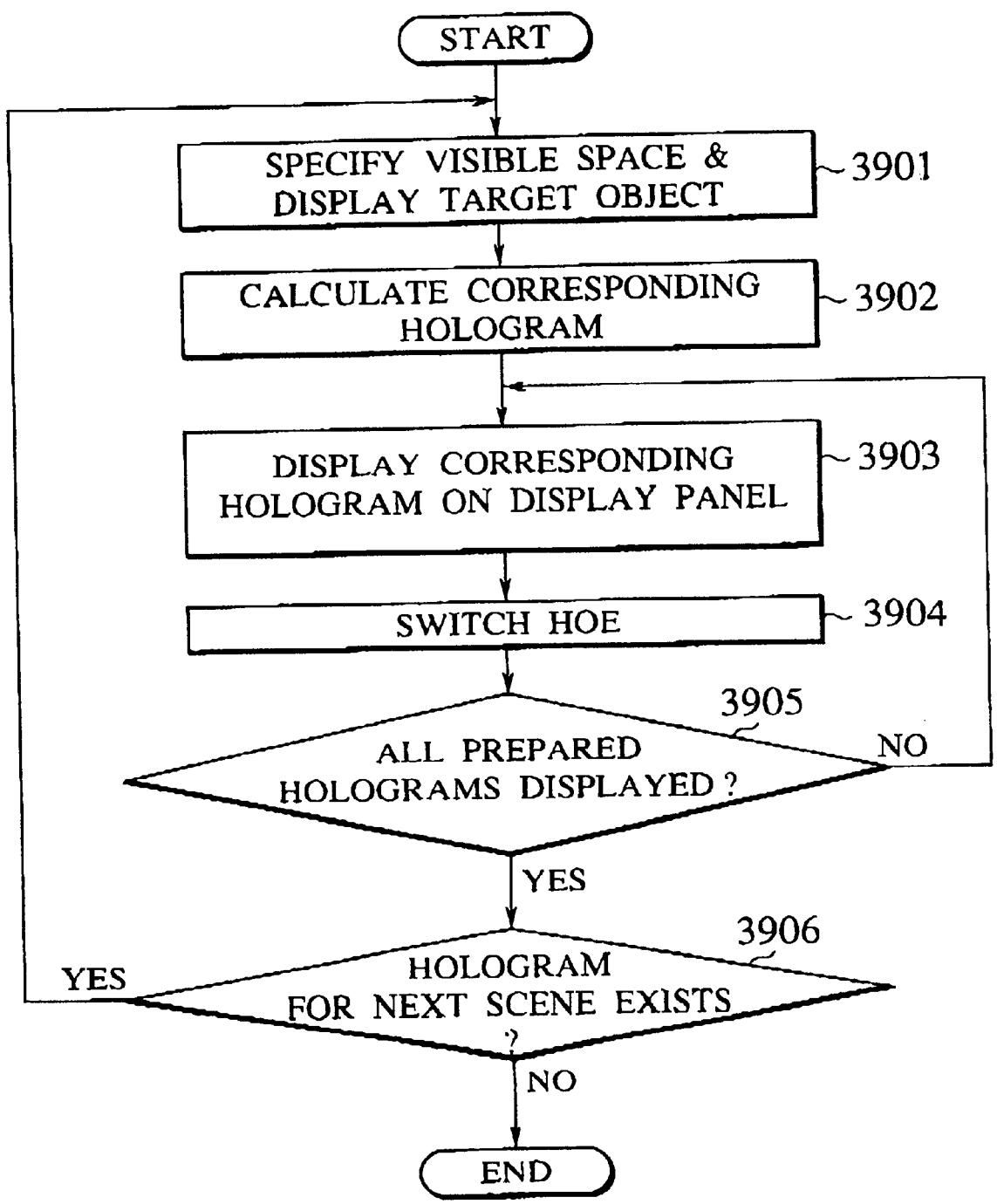
FIG. 23 is a flow chart for an operation of the three-dimensional image display device of FIG. 21.

Next, with reference to FIG. 23, the display operation procedure in the fourth embodiment will be described.

Figure 24:
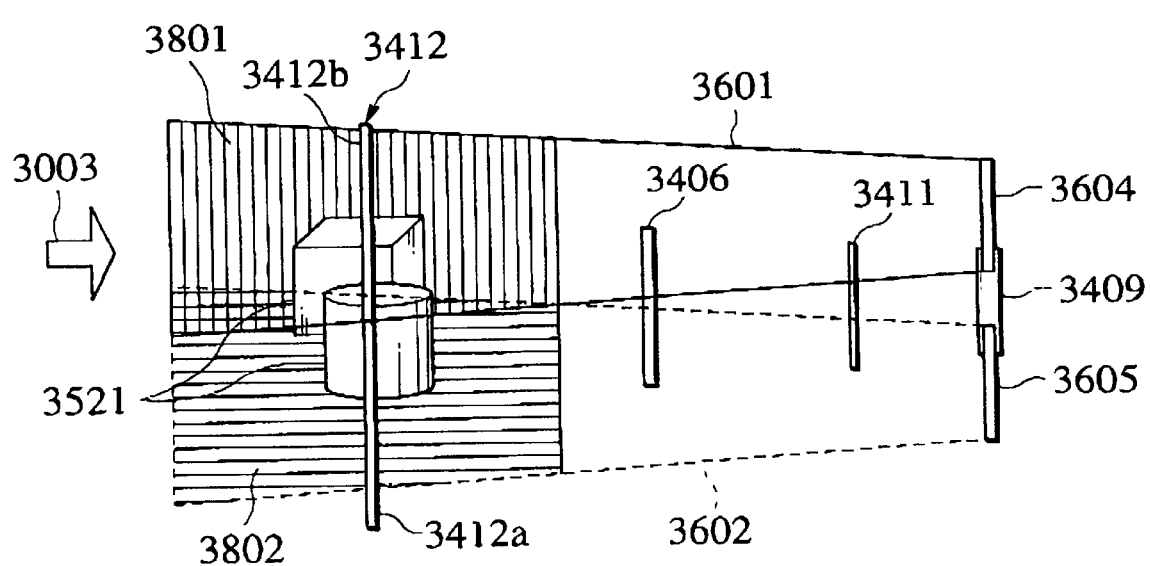
FIG. 24 is a diagram for illustrating image recording and reproduction operation in the three-dimensional image display device of FIG. 21.

FIG. 24 illustrates the recording and reproduction of images in the case of using HOE in the configuration of FIG. 22. First, a visible space and a display target object are determined. For example, in the case of displaying three-dimensional objects (a cube and a cylinder) 3521 shown in FIG. 24, the calculation of a hologram-1 for reproducing an image contained in a visible space 3801 and a hologram-2 for reproducing an image contained in a visible space 3802 is specified (step 3901), and these hologram-1 and hologram-2 are calculated in advance (step 3902).

Here, an exemplary method for determining the visible space will be described. If the display device is provided at a position 3604, the object light is propagated through a region 3601. At this point, the visible space that can be observed by the observer is set to be a region 3801 including a region through which the object light will be propagated after transmitting through the HOE 3412 that plays a role of a screen. Here, a range of distances from the screen that are to be included in the visible space that can be observed may differ depending on the display target object, and it is not necessarily limited to the case where a visible space is set up to a fixed length in the depth direction as in the region 3801 shown in FIG. 24. It is also possible to carry out the calculation by setting the visible space extending to infinity. Similarly, if the display device is provided at a position 3605, the visible space is set to be a region 3802. Note that the display device is actually attached at a position 3409, and regions 3604 and 3605 are virtual positions from a viewpoint of the observer.

The calculated holograms are sequentially displayed at the display device 3409 (step 3903), while at the same time the HOE 3411 is switched between the hologram plate 3300-1 and the hologram plate 3300-2 in synchronization with the hologram display (step 3904). For example, the hologram-1 is a hologram corresponding to the visible space 3801 and the hologram-2 is a hologram corresponding to the visible space 3802. The HOE 3411 is switched such that the hologram plate 3300-2 is used while the hologram-1 is displayed, and the hologram plate 3300-1 is used while the hologram-2 is displayed. The steps 3903 and 3904 are repeated until all the prepared holograms are displayed.

When all the prepared holograms are displayed (step 3905 YES), the operation returns to the start and the holograms corresponding to a next scene are sequentially displayed if there is a next scene (step 3906 YES).

As a method for switching the HOE 3411, it is possible to use a method for sequentially displaying patterns that play the role of the HOE by using an electronic device, or a method for producing a plurality of patterns that play the role of the HOE on a rotary disk and switching patterns by rotating the rotary disk.

Figure 25A:
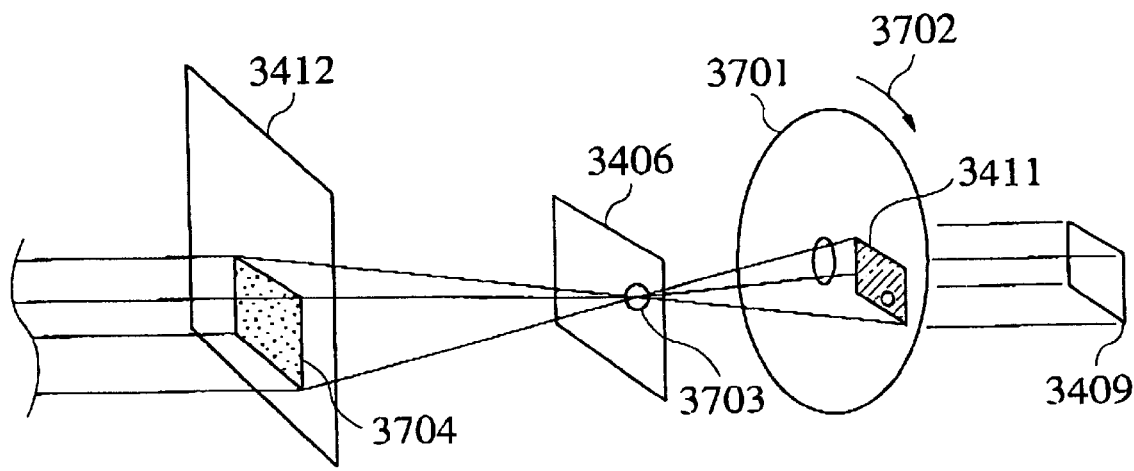
FIGS. 25A and 25B are schematic diagrams showing exemplary configurations for switching holographic optical elements using a rotary disk that can be used in the three-dimensional image display device of FIG. 21.

FIG. 25A shows an exemplary configuration for the latter method in which a plurality of HOE patterns 3411 with different light converging positions are produced on a rotary disk 3701 that is provided at a position of the HOE 3411 in FIG. 22, and the HOE patterns 3411 are switched by rotating the rotary disk 3701 in the clockwise direction 3702 in synchronization with the hologram display refresh rate of the display device 3409. In this configuration, if the HOE 3411 corresponds to the hologram plate 3300-2, the object light generated by the display device 3409 is converged to a portion 3703 on the photorefractive medium 3406 by the light converging effect of the HOE 3411. In addition, the light transmitted through the photorefractive medium 3406 is irradiated onto a portion 3704 on the HOE 3412 that plays the role of the screen. At this portion 3704, the hologram plate 3300-2 described above is attached in reverse orientation (with the B-plane on the input side and the A-plane on the output side). Then, the light transmitted through the portion 3704 are converted into the collimated beam again such that the wavefront of the object light generated by the display device 3409 is reproduced.

When the next hologram is displayed on the display device 3409, the rotary disk 3701 is rotated to place the next HOE pattern at a position of the HOE 3411.

Figure 25B:
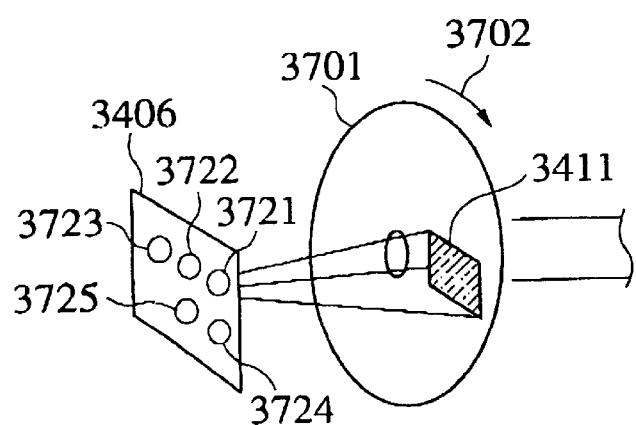

By using the rotary disk 3701 with a plurality of HOE patterns with different focal point positions (light converging positions), as shown FIG. 25B, the light converging position will be sequentially shifted to positions 3721, 3722, 3723, 3724 and 3725, for example, and different interference fringes will be recorded at the respective portions. By sequentially reproducing the recorded images sequentially or at once, it is also possible to multiply display the holographic images of a plurality of frames.

Note that the number and the size of HOE patterns can be appropriately changed according to the focal point distances of the HOEs and the display format.

Figure 26:
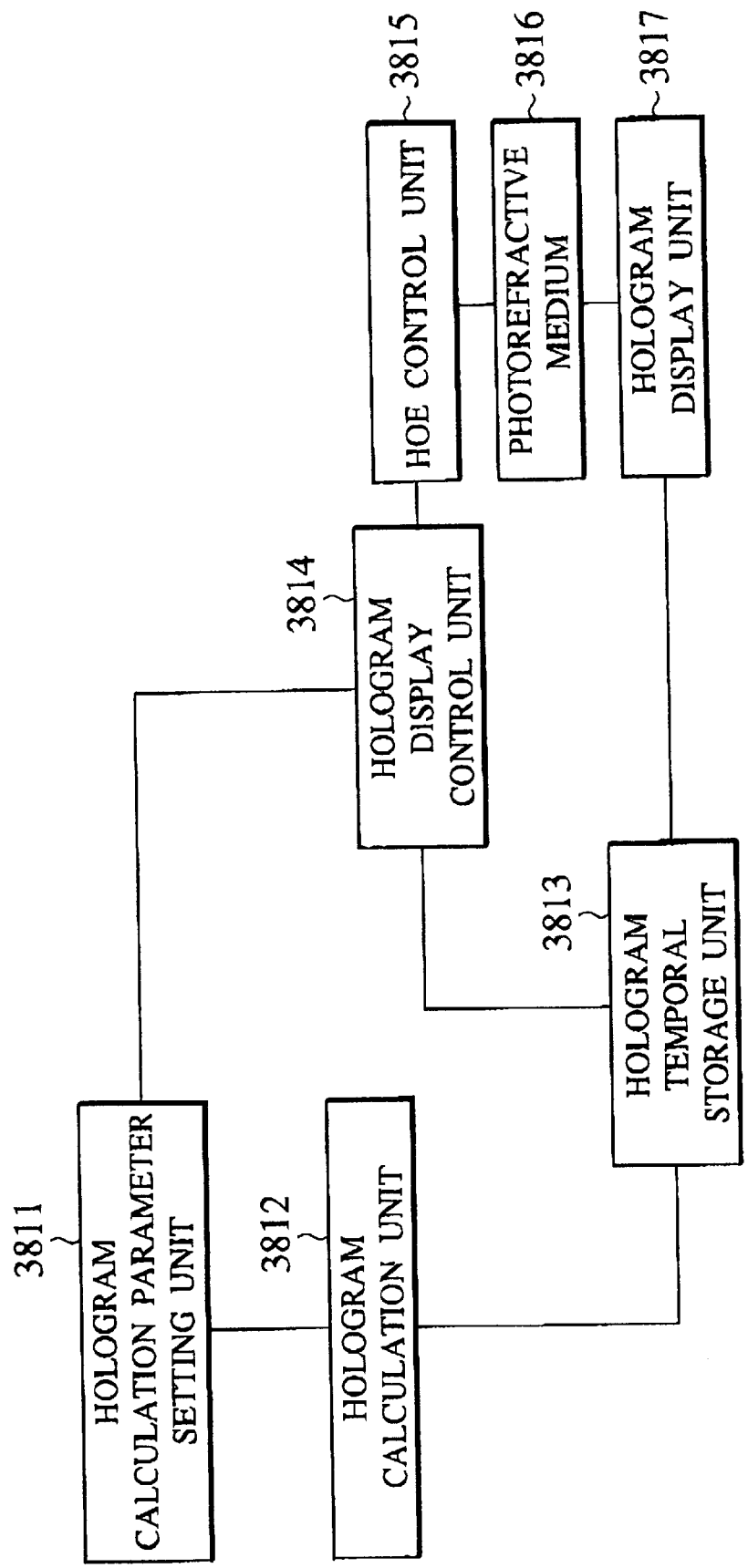
FIG. 26 is a block diagram showing a functional configuration of the three-dimensional image display device of FIG. 21.

FIG. 26 shows a functional configuration of the three-dimensional image display device in the fourth embodiment, which comprises a hologram calculation parameter setting unit 3811, a hologram calculation unit 3812, a hologram temporal storage unit 3813, a hologram display control unit 3814, a HOE control unit 3815, a hologram recording medium 3816, and a hologram display unit 3817.

The hologram calculation parameter setting unit 3811 sets parameters (display target objects, reproduction positions, etc.) for generating holograms corresponding to the respective visible spaces, and the hologram calculation unit 3812 calculates holographic images of the display target objects according to these parameters. The calculated holographic images are temporarily stored in the hologram temporal storage unit 3813 (such as a frame memory or a hard disk, for example).

The hologram display control unit 3814 reads out hologram data from the hologram temporal storage unit 3813 and displays holograms on the hologram display unit 3817 formed by the reflective liquid crystal panel or the like, while also sends control signals to the HOE control unit 3815 so as to carry out the HOE switching and record the interference fringes generated by the object light and the reference light as holograms in the photorefractive medium 3816. By repeating the above processing, it is possible to reproduce the video holographic display.

As described, according to the fourth embodiment, the holographic optical elements are provided in front and behind of the photorefractive medium on the optical path and the light converging and the conversion into the plane wave of the object light are carried out by these holographic optical elements so that it becomes possible to realize the holographic display of three-dimensional images with a wide view field by a compact configuration.

Also, the photorefractive medium formed by the photorefractive crystal has its diffraction efficiency increased in proportion to the light intensity so that the time required for the recording becomes shorter and thereby the amount of recorded information per unit time increases and the recording efficiency is improved.

Also, as the recording efficiency is improved by the light converging effect of the holographic optical elements, it becomes possible to obtain images with higher contrast compared with the conventional method, even when the frames are switched at high speed.

Note that, in the fourth embodiment described above, the HOE is produced as interference fringes of two lights, but it is also possible to utilize the Fresnel lens instead. In other words, the fourth embodiment is not limited to any specific method of producing the HOE to be used, and any element in which the propagation direction of the light is controllable can be used. In the case of using the Fresnel lens, the lens can be designed such that the focal point position of the lens is not at the center of the lens but at the periphery of the lens.

It is also possible to modify the fourth embodiment such that the recording and the reproduction of a plurality of holograms are carried out in time sharing basis by using a plurality of reference lights with different incident angles as in the third embodiment.

In the fourth embodiment, the holographic optical elements are used and the control of the light converging position is realized by the switching of the HOEs alone. Then, the light transmitted through the photorefractive medium is made to transmit through another reproduction side HOE again such that the optical path of the transmitted light is changed to the same direction as the propagation direction of the wavefront emitted from the display device. In this way, the HOE plane is set to a size of a screen (space) on which the three-dimensional image can be displayed, so that it becomes possible to realize a large scale image by combining HOEs.

In order to realize the similar size of the visible field as in the fourth embodiment by using the conventional method, it is necessary to produce a lens with a large diameter and a short focal point distance, but it has been difficult to manufacture such a lens. In contrast, the HOE with a large size and a short focal point distance can be easily manufactured optically so that it becomes possible to realize the large scale three-dimensional display by a compact configuration.

Also, by attaching HOEs on the rotary disk or the like, it is possible to switch the HOEs at high speed so that it also becomes possible to realize the large scale video display while making a device configuration compact.

Referring now to FIG. 27 to FIG. 30, the fifth embodiment of a method and an apparatus for three-dimensional holographic display according to the present invention will be described in detail.

Figure 27:
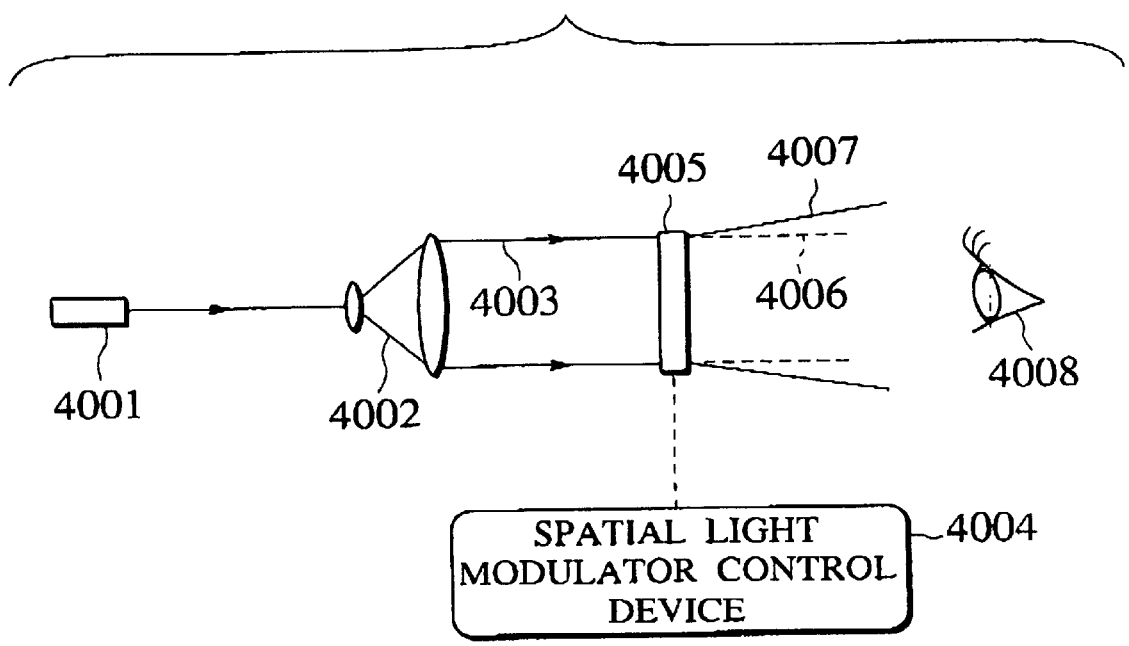
FIG. 27 is a schematic block diagram showing a configuration of a conventionally known three-dimensional holographic display device using a spatial light modulator.

FIG. 27 shows a conventionally known three-dimensional holographic display device using a spatial light modulator (such as a liquid crystal panel) as a holographic object light source. In the conventional of FIG. 27, a spatial light modulator control device 4004 calculates a pattern to be generated by a spatial light modulator 4005 such that the diffracted light obtained by irradiating the light emitted from a laser 4001 onto the spatial light modulator 4005 becomes the desired holographic object light 4007, and the spatial light modulator 4005 generates the calculated pattern which diffracts the light from the laser 4001 such that the desired holographic object light 4007 is generated, and an observer 4008 can sense the three-dimensional image by observing this object light.

However, in this conventional three-dimensional holographic display device, the resolution of the spatial light modulator is at most 10 μm so that the diffraction angle can be at most about 1 degree as should be well known to those skilled in the art, and due to the smallness of this diffraction angle, there has been a problem that the visual field is narrow. In addition, there has also been a problem that the 0-th order light 4006 that transmitted through the spatial light modulator 4005 is contained in the displayed image.

Also, due to the fact that the number of gray levels that can be produced by the spatial light modulator is as small as about several hundreds, patterns that can be displayed by the spatial light modulator can reproduce only the object light reflected from a small region of the object, so that there has been a problem that it is impossible to realize the fine three-dimensional image display.

In this regard, it is possible to use the method of the first embodiment described above in which the fine images are reproduced by sequentially generating in time sharing basis a plurality of object lights generated by the spatial light modulator so as to utilize the visual afterimage effect of the human being. However, when the switching rate of the spatial light modulator is about several tens msec per frame, the fine three-dimensional image can be reproduced only for a simple image such as that of a wireframe model of a cube, and besides this switching will be perceived by the observer as flickering of the image.

This fifth embodiment is directed to a configuration for resolving these problems.

Figure 28:
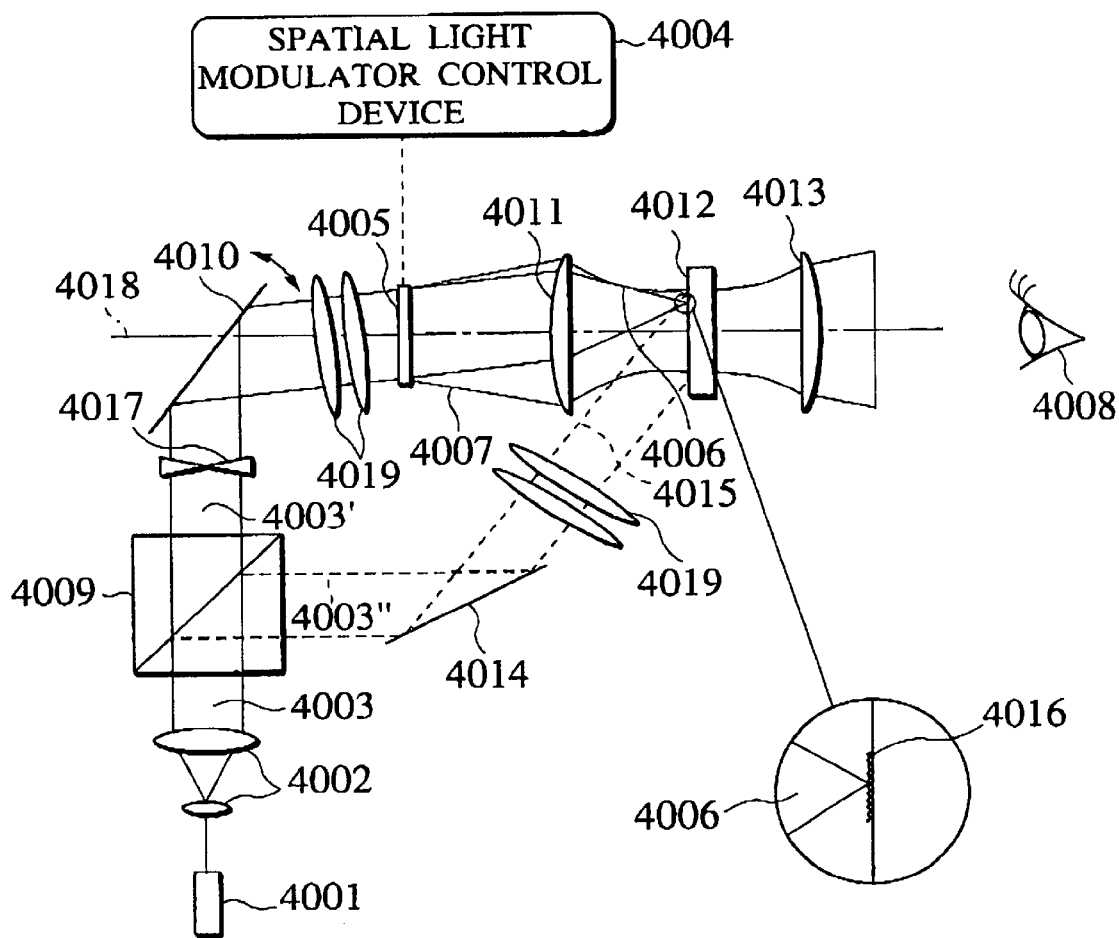
FIG. 28 is a schematic block diagram showing a first exemplary configuration of a holographic display device according to the fifth embodiment of the present invention.

FIG. 28 shows a first exemplary schematic configuration of a holographic display device of the fifth embodiment, which comprises a laser 4001, a beam expander 4002, a collimated incident light 4003, an incident light 4003' for holographic object light, an incident light 4003" for reference light, a spatial light modulator control device 4004, a spatial light modulator 4005, a 0-th order light 4006, a holographic object light 4007, a spatial observation position 4008, a polarizing beam splitter 4009, a movable mirror 4010, lenses 4011 and 4013, a photorefractive medium 4012 made of a material having a photorefractive effect, a fixed mirror 4014, a reference light 4015, micro-mirrors 4016, a shutter 4017, an optical axis 4018, and relay lenses 4019.

In this holographic display device of FIG. 28, the laser beam emitted by the laser 4001 is expanded into the collimated incident light 4003 by the beam expander 4002, and divided by the polarizing beam splitter 4009 into the incident light 4003' for holographic object light and the incident light 4003" for reference light that are to be used for the recording and the reproduction using the photorefractive medium 4012.

The holographic object light 4007 is obtained by entering the incident light 4003' for holographic object light into the spatial light modulator 4005 on which the holographic object light generation pattern is generated under the control of the spatial light modulator control device 4004. When the incident light 4003' for holographic object light passes through the spatial light modulator 4005, it becomes the holographic object light 4007 that is diffracted by the spatial light modulator 4005 and the 0-th order light 4006 that is transmitted through the spatial light modulator 4005. The lens 4011 is adjusted to converge the 0-th order light 4006 on a surface of the photorefractive medium 4012, and the micro-mirrors 4016 is provided at a position for reflecting the 0-th order light 4006 that is converged on the surface of the photorefractive medium 4012.

Also, the incident angle of the incident light 4003' for holographic object light with respect to the spatial light modulator 4005 can be changed by moving the movable mirror 4010. The micro-mirrors 4016 are provided only over a region sufficient to reflect the converged 0-th order light 4006 as scanned by moving the movable mirror 4010.

On the other hand, the incident light 4003" for reference light is irradiated onto the photorefractive medium 4012 through the fixed mirror 4014 as the reference light 4015.

In this configuration of FIG. 28, at a time of recording three-dimensional images, the movable mirror 4010 is moved and fixed to a specific angle first. Then, one of a plurality of holographic object light generation patterns is generated at the spatial light modulator 4005, and the incident light 4003' for holographic object light and the incident light 4003" for reference light are entered. By this series of operations, one three-dimensional image is recorded in the photorefractive medium 4012.

Then, the movable mirror 4010 is moved and fixed to another specific angle, the holographic object light generation pattern to be displayed at the spatial light modulator 4005 is switched, and the incident light 4003' for holographic object light and the incident light 4003" for reference light are entered, so as to record the second three-dimensional image in the photorefractive medium 4012. By repeating the similar operations within a range of movable angles of the movable mirror 4010, a plurality of three-dimensional images are multiply recorded in the photorefractive medium 4012.

At a time of reproducing three-dimensional images, the incident light 4003' for holographic object light is blocked by closing the shutter 4017, and only the reference light 4015 is irradiated onto the photorefractive medium 4012 such that the multiply recorded three-dimensional images are reproduced collectively.

In this configuration of FIG. 28, a plurality of holographic object lights generated through the spatial light modulator 4005 can be displayed collectively by using the photorefractive medium 4012 for the three-dimensional image recording. By this collective display of a plurality of holographic object lights, it is possible to obtain the fine display images beyond the limitation of the spatial light modulator 4005.

In addition, the displayed three-dimensional images are not displayed in time sharing basis so that the flickering of the image that is problematic in the case of the display in time sharing basis can be eliminated.

Using a green laser with wavelength of 532 nm and the output power of 150 mW as the laser 4001, a transmissible spatial light modulator with the resolution of 512 dots×512 dots as the spatial light modulator 4005, and a single crystal of Ce-doped strontium barium niobate ($Sr_{0.69}Ba_{0.31}Nb_2O_6$) containing 0.02 weight % of $CeO_2$ as the photorefractive medium 4012, and moving the movable mirror 4010 over the swinging angle of ±1°, it was possible to record 100 holograms into the photorefractive medium 4012 by the exposure time of 5 msec at every 0,02° of the swinging angle of the movable mirror 4010, and it was possible to collectively reproduce all of the recorded 100 holograms.

Figure 29A:
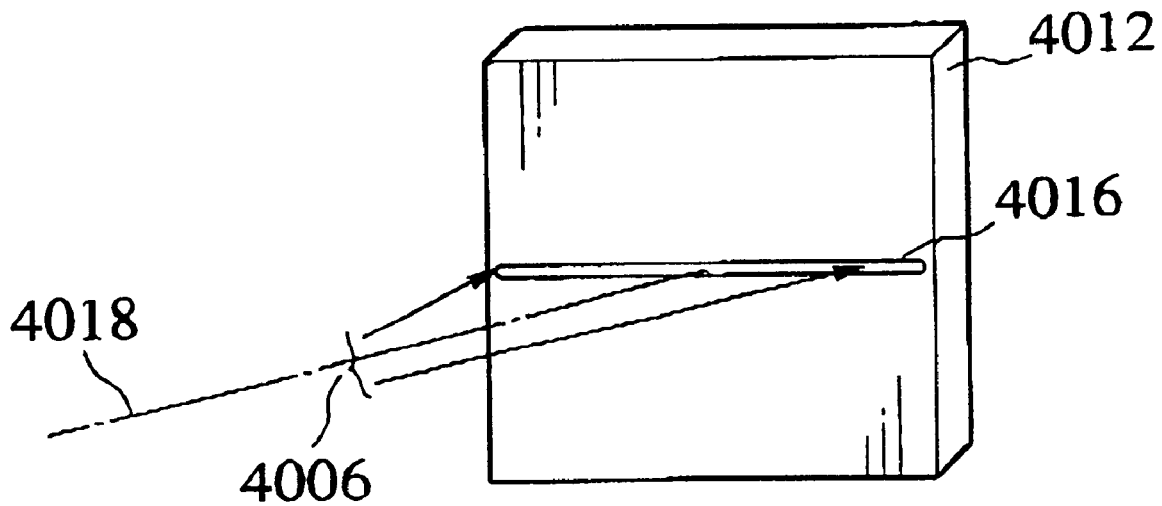
FIGS. 29A and 29B are schematic diagrams showing exemplary arrangements of micro-mirrors that can be used in the holographic display device of FIG. 28.
Figure 29B:
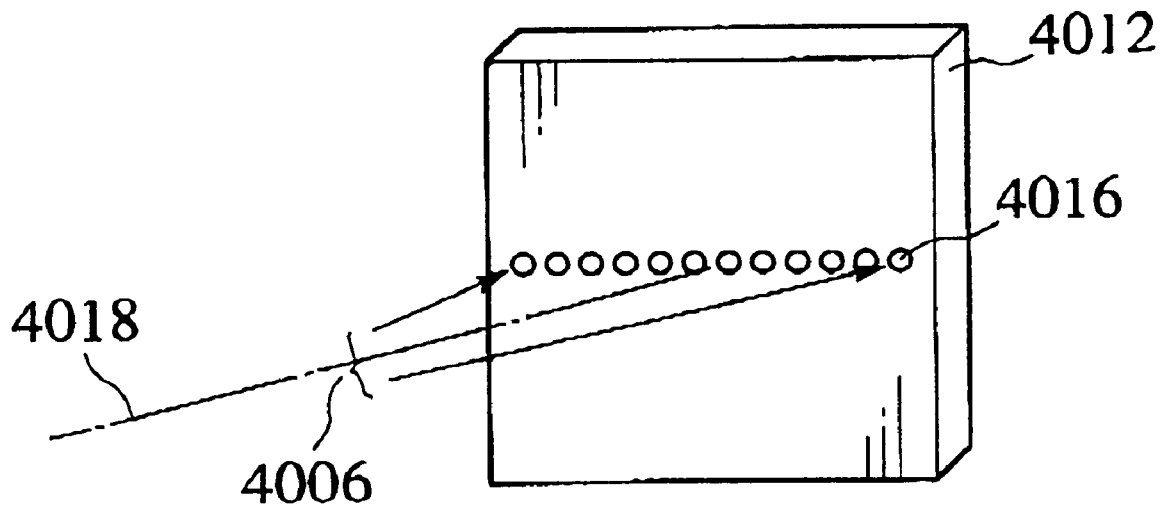

Also, the 0-th order light 4006 that has transmitted through the spatial light modulator 4005 are converged by the lens 4011 and reflected by the micro-mirrors 4016 provided on the surface of the photorefractive medium 4012 so that it was not observed. Consequently, the image as sensed by the observer at the observation position 4008 consisted purely of the multiple object lights 4007 so that it was possible to obtain more natural and vivid three-dimensional display image. The 0-th order light 4006 that has reached the surface of the photorefractive medium 4012 moves as a result of the scanning by moving the movable mirror 4010, so that the micro-mirrors 4016 are arranged in a line shape as shown in FIG. 29A or in dot sequence shape as shown in FIG. 29B, depending on whether the movable mirror 4010 is moved continuously or stepwise.

Also, by moving the movable mirror 4010, the object light recorded in the photorefractive medium 4012 has a spread corresponding to the swinging angle of the movable mirror 4010, so that even when the observation position 4008 of the observer is displaced from the optical axis 4018, it was possible to sense the three-dimensional image as long as the angle of the observation position 4008 with respect to the optical axis 4018 is within the swinging angle of the movable mirror 4010.

Figure 30:
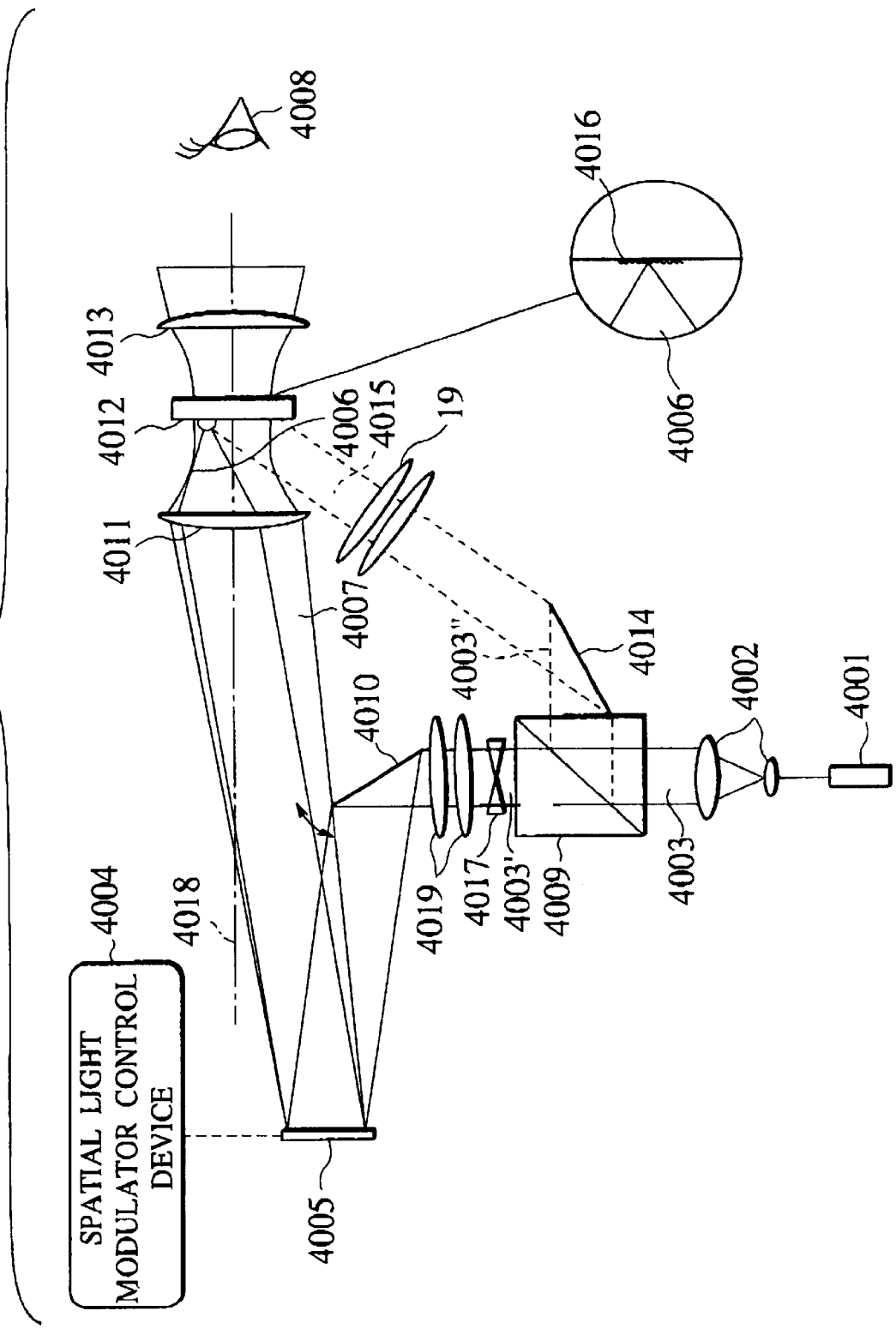
FIG. 30 is a schematic block diagram showing a second exemplary configuration of a holographic display device according to the fifth embodiment of the present invention.

FIG. 30 shows a second exemplary schematic configuration of a holographic display device of the fifth embodiment, which differs from the configuration of FIG. 28 in that a reflective spatial light modulator 4005 is used.

In this holographic display device of FIG. 30, the laser beam emitted by the laser 4001 is expanded into the collimated incident light 4003 by the beam expander 4002, and divided by the polarizing beam splitter 4009 into the incident light 4003' for holographic object light and the incident light 4003" for reference light that are to be used for the recording and the reproduction using the photorefractive medium 4012.

The holographic object light 4007 is obtained by entering the incident light 4003' for holographic object light into the spatial light modulator 4005 on which the holographic object light generation pattern is generated under the control of the spatial light modulator control device 4004.

At the reflective spatial light modulator 4005, the incident light 4003' for holographic object light is reflected and diffracted, and it becomes the holographic object light 4007 and the 0-th order light 4006. The lens 4011 is adjusted to converge the 0-th order light 4006 on a surface of the photorefractive medium 4012, and the micro-mirrors 4016 is provided at a position for reflecting the 0-th order light 4006 that is converged on the surface of the photorefractive medium 4012.

Also, the incident angle of the incident light 4003' for holographic object light with respect to the spatial light modulator 4005 can be changed by moving the movable mirror 4010. The micro-mirrors 4016 are provided only over a region sufficient to reflect the converged 0-th order light 4006 as scanned by moving the movable mirror 4010.

On the other hand, the incident light 4003" for reference light is irradiated onto the photorefractive medium 4012 through the fixed mirror 4014 as the reference light 4015.

In this configuration of FIG. 30, at a time of recording three-dimensional images, the incident light 4003' for holographic object light and the incident light 4003" for reference light are entered while moving the movable mirror 4010 and sequentially switching the holographic object light generation pattern displayed at the spatial light modulator 4005, such that a plurality of three-dimensional images are multiply recorded in the photorefractive medium 4012 by the incident light 4003' for holographic object light with different incident angles.

At a time of reproducing three-dimensional images, the incident light 4003' for holographic object light is blocked by closing the shutter 4017, and only the reference light 4015 is irradiated onto the photorefractive medium 4012 such that the multiply recorded three-dimensional images are reproduced collectively.

Also, the 0-th order light 4006 that has reflected by the spatial light modulator 4005 are reflected by the micro-mirrors 4016 provided on the surface of the photorefractive medium 4012 similarly as in the case of FIG. 28 so that it is not observable and therefore it is possible to obtain more natural and vivid three-dimensional display image.

Also, by moving the movable mirror 4010, the object light recorded in the photorefractive medium 4012 has a spread corresponding to the swinging angle of the movable mirror 4010, so that even when the observation position 4008 of the observer is displaced from the optical axis 4018, it is possible to sense the three-dimensional image as long as the angle of the observation position 4008 with respect to the optical axis 4018 is within the swinging angle of the movable mirror 4010.

As described, according to the fifth embodiment, by recording the object lights generated by the spatial light modulator in the photorefractive medium, and collectively displaying a plurality of recorded images, even though each three-dimensional image generated by the spatial light modulator is a rather simple image, it is possible to obtain the fine display image. Moreover, the flickering of the display image associated with the display in time sharing basis can be eliminated.

Also, by providing one or a plurality of micro-mirrors on a surface of the photorefractive medium and blocking the 0-th order light that has transmitted through the spatial light modulator by these micro-mirrors, it is possible to eliminate an influence of the 0-th order light on the display image, so that it is possible to obtain vivid high quality display image. In addition, by changing the incident angle of the incident light to be irradiated onto the spatial light modulator, it is possible to enlarge the visual field.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method of holographic display of a three-dimensional image, comprising the steps of:

displaying at least one hologram of a display target object on a display device, and irradiating a non-scattered light onto the display device to produce a scattered light;

irradiating the scattered light from the display device as an object light of the display target object and the non-scattered light as a reference light simultaneously at different incident angles onto a photorefractive medium having a photorefractive effect, and recording interference fringes generated by the object light and the reference light in the photorefractive medium; and displaying the three-dimensional image by irradiating only the non-scattered light onto the photorefractive medium so as to reproduce a holographic image corresponding to the interference fringes recorded in the photorefractive medium.

2. The method of claim 1, further comprising the steps of:

opening a first shutter provided between the display device and the photorefractive medium and closing a second shutter provided between the photorefractive medium and an observer while recording the interference fringes in the photorefractive medium; and closing the first shutter and opening the second shutter while reproducing the holographic image corresponding to the interference fringes recorded in the photorefractive medium.

3. The method of claim 1, wherein the display device sequentially displays a plurality of holograms while the non-scattered light is irradiated thereon.

4. The method of claim 1, wherein an irradiation time of the non-scattered light irradiated at a time of reproducing the holographic image corresponding to the interference fringes recorded in the photorefractive medium is set longer than an irradiation time of the non-scattered light irradiated at a time of recording the interference fringes in the photorefractive medium.

5. The method of claim 1, wherein an intensity of the non-scattered light irradiated at a time of reproducing the holographic image corresponding to the interference fringes recorded in the photorefractive medium is set stronger than an intensity of the non-scattered light irradiated at a time of recording the interference fringes in the photorefractive medium.

6. The method of claim 1, wherein the display device displays a plurality of holograms in time sharing basis, and an irradiation position of the scattered light at a time of recording the interference fringes in the photorefractive medium is changed in synchronization with switching of a displayed hologram on the display device.

7. The method of claim 1, wherein the non-scattered light irradiated onto the display device and the non-scattered light irradiated onto the photorefractive medium are obtained by splitting a single input light using a polarizing beam splitter, and the scattered light from the display device is irradiated onto the photorefractive medium by transmitting through the polarizing beam splitter.

8. The method of claim 1, wherein the display device is a liquid crystal panel.

9. The method of claim 1, wherein the photorefractive medium is a photorefractive crystal.

10. The method of claim 1, wherein a plurality of non-scattered lights with mutually different incident angles are used in recording the interference fringes for a plurality of holographic images in the photorefractive medium and reproducing the plurality of holographic images corresponding to the interference fringes recorded in the photorefractive medium.

11. The method of claim 10, wherein the plurality of non-scattered lights are irradiated onto the photorefractive medium in time sharing basis.

12. The method of claim 10, wherein the display device sequentially displays a plurality of holograms, and the non-scattered light irradiated onto the photorefractive medium at a time of recording the interference fringes in the photorefractive medium is sequentially switched among the plurality of non-scattered lights in synchronization with switching of a displayed hologram on the display device.

13. The method of claim 10, wherein the plurality of non-scattered lights is obtained by splitting a single non-scattered light using a polarizing beam splitter.

14. The method of claim 10, further comprising the step of:
opening one of a plurality of shutters provided on optical paths of the plurality of non-scattered lights while closing others of the plurality of shutters so as to selectively irradiate one of the plurality of non-scattered lights onto the photorefractive medium at a time of recording the interference fringes in the photorefractive medium and at a time of reproducing the holographic image corresponding to the interference fringes recorded in the photorefractive medium.

15. The method of claim 1, wherein the display device sequentially displays a plurality of holograms of the display target object from a plurality of viewpoints;
each scattered light produced by each hologram displayed on the display device is entered into a first holographic optical element provided between the display device and the photorefractive medium at a time of recording the interference fringes in the photorefractive medium such that an optical path of each scattered light is changed and each scattered light is converged on a prescribed position on the photorefractive medium by the first holographic optical element;

each object light produced by irradiating the non-scattered light onto the photorefractive medium at a time of reproducing the holographic image corresponding to the interference fringes recorded in the photorefractive medium is entered into a second holographic optical element provided between the photorefractive medium and an observer such that an optical path of each object light is changed to an original propagation direction of the scattered light from the display device.

16. The method of claim 15, wherein a plurality of patterns for the first holographic optical element are attached on a rotary disk provided on an optical path of each scattered light produced by each hologram displayed on the display device, and the rotary disk is rotated in accordance with a switching rate of a displayed hologram on the display device.

17. The method of claim 15, wherein a plurality of non-scattered lights with mutually different incident angles are used in recording the interference fringes for a plurality of holographic images in the photorefractive medium and reproducing the plurality of holographic images corresponding to the interference fringes recorded in the photorefractive medium.

18. The method of claim 1, wherein the display device is a spatial light modulator which sequentially displays a plurality of holograms such that a plurality of interference fringes for the plurality of holograms are sequentially and multiply recorded in the photorefractive medium, and the plurality of holographic images corresponding to the plurality of interference fringes recorded in the photorefractive medium are collectively reproduced.

19. The method of claim 18, further comprising the steps of:
converging 0-th order light produced at the spatial light modulator by a lens; and
reflecting the 0-th order light converged by the lens at one or a plurality of micro-mirrors provided on an input side of the photorefractive medium.

20. The method of claim 18, further comprising the step of:
changing an incident angle of the non-scattered light irradiated onto the spatial light modulator.

21. A three-dimensional holographic display apparatus, comprising:
a display device for displaying at least one hologram of a display target object;
a photorefractive medium having a photorefractive effect for recording interference fringes generated by an object light and a reference light irradiated thereon; and
an optical system for irradiating a non-scattered light onto the display device to produce a scattered light and then irradiating the scattered light from the display device as the object light of the display target object and the non-scattered light as the reference light simultaneously at different incident angles onto the photorefractive medium at a time of recording the interference fringes in the photorefractive medium, and irradiating only the non-scattered light onto the photorefractive medium at a time of reproducing a holographic image corresponding to the interference fringes recorded in the photorefractive medium as a three-dimensional image.

22. The apparatus of claim 21, further comprising:
a first shutter provided between the display device and the photorefractive medium and a second shutter provided between the photorefractive medium and an observer; and
a controller for opening the first shutter and closing the second shutter while recording the interference fringes in the photorefractive medium, and closing the first shutter and opening the second shutter while reproducing the holographic image corresponding to the interference fringes recorded in the photorefractive medium.

23. The apparatus of claim 21, wherein the display device sequentially displays a plurality of holograms while the non-scattered light is irradiated thereon.

24. The apparatus of claim 21, wherein the optical system controls an irradiation time of the non-scattered light such that an irradiation time of the non-scattered light irradiated at a time of reproducing the holographic image corresponding to the interference fringes recorded in the photorefractive medium is set longer than an irradiation time of the non-scattered light irradiated at a time of recording the interference fringes in the photorefractive medium.

25. The apparatus of claim 21, wherein the optical system controls an intensity of the non-scattered light such that an intensity of the non-scattered light irradiated at a time of reproducing the holographic image corresponding to the interference fringes recorded in the photorefractive medium is set stronger than an intensity of the non-scattered light irradiated at a time of recording the interference fringes in the photorefractive medium.

26. The apparatus of claim 21, wherein the display device displays a plurality of holograms in time sharing basis, and the optical system includes an optical path changing unit for changing an irradiation position of the scattered light at a time of recording the interference fringes in the photorefractive medium in synchronization with switching of a displayed hologram on the display device.

27. The apparatus of claim 21, wherein the optical system includes a polarizing beam splitter for splitting a single input light emitted from a light source into two lights corresponding to the non-scattered light irradiated onto the display device and the non-scattered light irradiated onto the photorefractive medium, the scattered light from the display device being irradiated onto the photorefractive medium by transmitting through the polarizing beam splitter.

28. The apparatus of claim 21, wherein the display device is a liquid crystal panel.

29. The apparatus of claim 21, wherein the photorefractive medium is a photorefractive crystal.

30. The apparatus of claim 21, wherein the optical system provides a plurality of non-scattered lights with mutually different incident angles that are used in recording the interference fringes for a plurality of holographic images in the photorefractive medium and reproducing the plurality of holographic images corresponding to the interference fringes recorded in the photorefractive medium.

31. The apparatus of claim 30, wherein the optical system irradiates the plurality of non-scattered lights onto the photorefractive medium in time sharing basis.

32. The apparatus of claim 30, wherein the display device sequentially displays a plurality of holograms, and the optical system sequentially switches the non-scattered light irradiated onto the photorefractive medium at a time of recording the interference fringes in the photorefractive medium among the plurality of non-scattered lights in synchronization with switching of a displayed hologram on the display device.

33. The apparatus of claim 30, wherein the optical system includes a polarizing beam splitter for splitting a single non-scattered light into the plurality of non-scattered lights.

34. The apparatus of claim 30, further comprising:
a plurality of shutters provided on optical paths of the plurality of non-scattered lights; and
a controller for opening one of the plurality of shutters while closing others of the plurality of shutters so as to selectively irradiate one of the plurality of non-scattered lights onto the photorefractive medium at a time of recording the interference fringes in the photorefractive medium and at a time of reproducing the holographic image corresponding to the interference fringes recorded in the photorefractive medium.

35. The apparatus of claim 21, wherein the display device sequentially displays a plurality of holograms of the display target object from a plurality of viewpoints;
the apparatus further comprises:
a first holographic optical element provided between the display device and the photorefractive medium, into which each scattered light produced by each hologram displayed on the display device is entered by the optical system at a time of recording the interference fringes in the photorefractive medium such that an optical path of each scattered light is changed and each scattered light is converged on a prescribed position on the photorefractive medium by the first holographic optical element; and
a second holographic optical element provided between the photorefractive medium and an observer, into which each object light produced by irradiating the non-scattered light onto the photorefractive medium at a time of reproducing the holographic image corresponding to the interference fringes recorded in the photorefractive medium is entered by the optical system such that an optical path of each object light is changed to an original propagation direction of the scattered light from the display device.

36. The apparatus of claim 35, further comprising a rotary disk provided on an optical path of each scattered light produced by each hologram displayed on the display device, on which a plurality of patterns for the first holographic optical element are attached, the rotary disk being rotated in accordance with a switching rate of a displayed hologram on the display device.

37. The apparatus of claim 35, wherein the optical system provides a plurality of non-scattered lights with mutually different incident angles that are used in recording the interference fringes for a plurality of holographic images in the photorefractive medium and reproducing the plurality of holographic images corresponding to the interference fringes recorded in the photorefractive medium.

38. The apparatus of claim 21, wherein the display device is a spatial light modulator which sequentially displays a plurality of holograms such that a plurality of interference fringes for the plurality of holograms are sequentially and multiply recorded in the photorefractive medium, and the plurality of holographic images corresponding to the plurality of interference fringes recorded in the photorefractive medium are collectively reproduced.

39. The apparatus of claim 38, further comprising:
a lens for converging 0-th order light produced at the spatial light modulator; and
one or a plurality of micro-mirrors provided on an input side of the photorefractive medium, for reflecting the 0-th order light converged by the lens.

40. The apparatus of claim 38, wherein the optical system includes a mechanism for changing an incident angle of the non-scattered light irradiated onto the spatial light modulator.

* * * * *